(12) United States Patent
Matsumoto et al.

(10) Patent No.: US 8,082,081 B2
(45) Date of Patent: Dec. 20, 2011

(54) VEHICLE CONTROL SYSTEM

(75) Inventors: Toshiki Matsumoto, Kariya (JP);
Mamoru Sawada, Yokkaichi (JP);
Takehito Fujii, Anjo (JP)

(73) Assignee: Denso Corporation, Kariya (JP)

( * ) Notice: Subject to any disclaimer, the term of this patent is extended or adjusted under 35 U.S.C. 154(b) by 328 days.

(21) Appl. No.: 12/080,438

(22) Filed: Apr. 2, 2008

(65) Prior Publication Data

US 2008/0249690 A1  Oct. 9, 2008

(30) Foreign Application Priority Data

Apr. 3, 2007  (JP) .................................. 2007-097791

(51) Int. Cl.
| | |
|---|---|
| G05D 1/00 | (2006.01) |
| G05D 3/00 | (2006.01) |
| B60R 22/00 | (2006.01) |
| E05F 15/00 | (2006.01) |
| G01M 17/00 | (2006.01) |
| G06F 7/00 | (2006.01) |
| G06F 19/00 | (2011.01) |

(52) U.S. Cl. .......................................... 701/48; 701/36
(58) Field of Classification Search .................... 701/36, 701/48
See application file for complete search history.

(56) References Cited

U.S. PATENT DOCUMENTS

| | | | | |
|---|---|---|---|---|
| 5,986,545 A | * | 11/1999 | Sanada et al. ................. | 340/439 |
| 2002/0091471 A1 | * | 7/2002 | Suzuki .......................... | 701/29 |
| 2005/0049761 A1 | | 3/2005 | Kataoka et al. | |
| 2005/0200088 A1 | | 9/2005 | Sawada et al. | |

FOREIGN PATENT DOCUMENTS

| | | |
|---|---|---|
| DE | 103 53 692 | 6/2004 |
| EP | 1 574 386 | 7/2006 |
| GB | 2 356 685 | 5/2001 |
| JP | 2004-038766 | 2/2004 |
| JP | 2004-168148 | 6/2004 |

OTHER PUBLICATIONS

U.S. Appl. No. 12/080,437, filed Apr. 2, 2008, Toshiki Matsumoto et al.
Search Report dated Jul. 17, 2009 in corresponding European Application No. 08006686.3.
Examination Report dated Sep. 11, 2009 in corresponding Chinese Application No. 2008100895285.

* cited by examiner

*Primary Examiner* — Tuan C. To
*Assistant Examiner* — Imran Mustafa
(74) *Attorney, Agent, or Firm* — Harness, Dickey & Pierce, PLC

(57) ABSTRACT

A vehicle control system controls vibrations that are generated at a plurality of portions of a vehicle. An engine/drive system ECU and a brake system ECU store the same vehicle vibration model that is separated into a vehicle body vibration model, a chassis vibration model and a tire vibration model, respectively. The engine/drive system ECU controls the suppression of the vehicle body vibrations that are estimated from the vehicle vibration model and the brake system ECU controls the suppression of the chassis vibrations and the tire vibrations. Accordingly, it is easy to execute control for suppressing the respective vibrations.

14 Claims, 17 Drawing Sheets

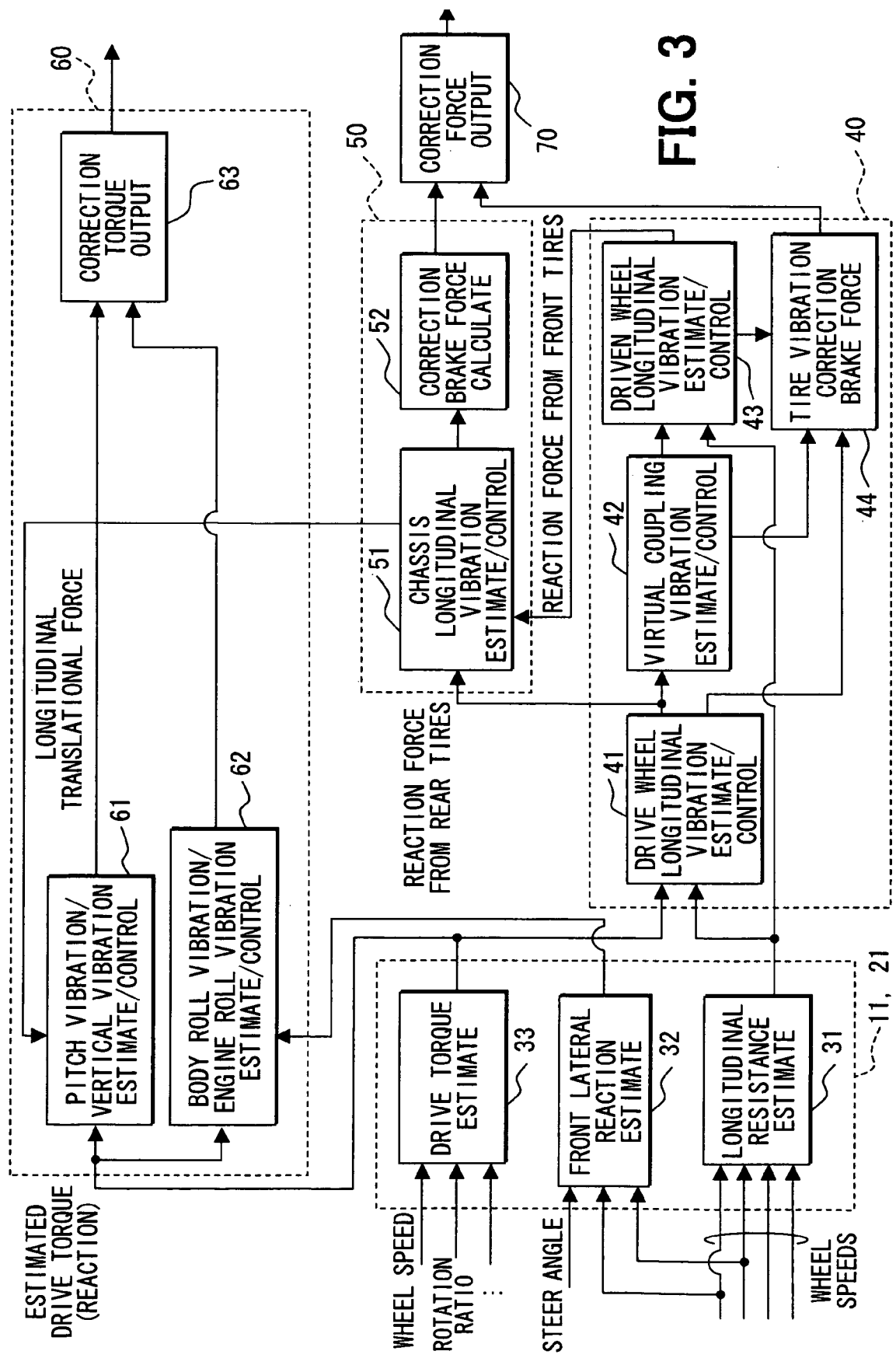

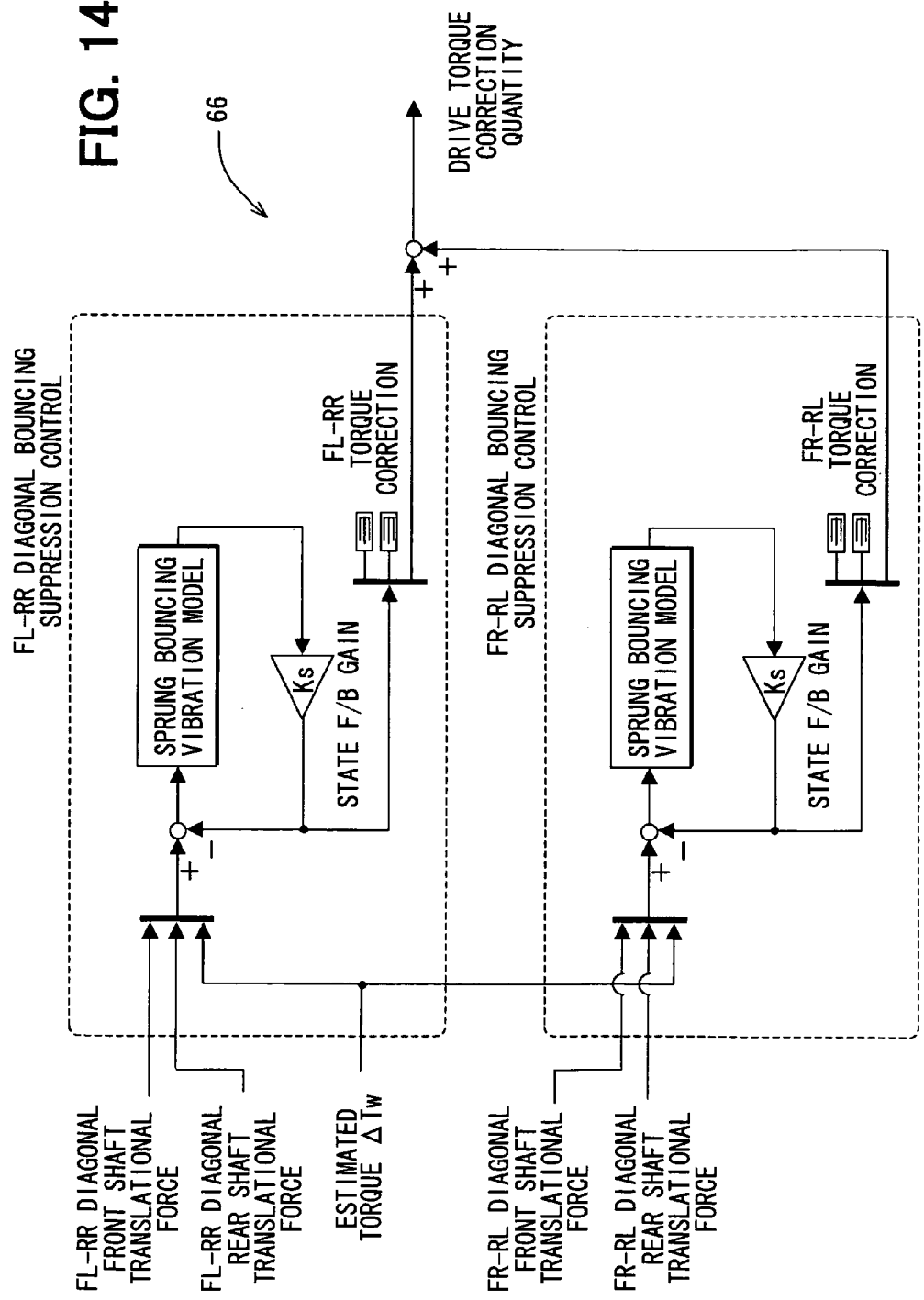

FIG. 15B

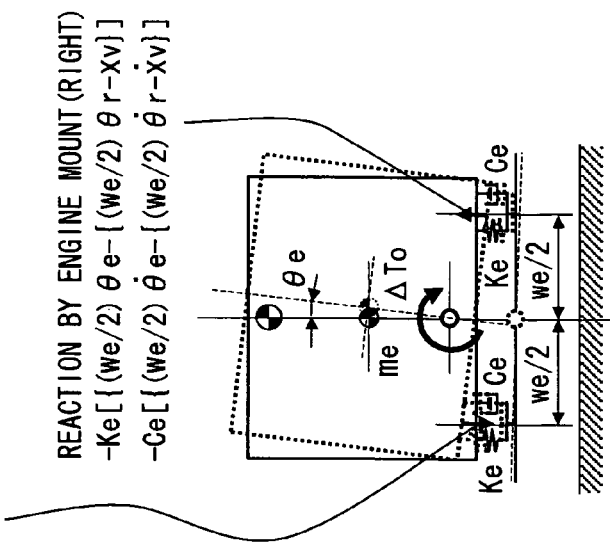

REACTION BY ENGINE MOUNT (LEFT)
−Ke[{(we/2)θe−[(we/2)θr+Xv}]
−Ce[{(we/2)θ̇e−[(we/2)θ̇r+Ẋv}]

REACTION BY ENGINE MOUNT (RIGHT)
−Ke[{(we/2)θe−[(we/2)θr−Xv}]
−Ce[{(we/2)θ̇e−[(we/2)θ̇r−Ẋv}]

FIG. 15A

VEHICLE ROLL MOMENT DUE TO SLANT ROTATION OF ENGINE AND TRANSMISSION, AND VEHICLE BODY GRAVITY CENTER DISPLACEMENT we{Ke(θe−θr)+Ce(θ̇e−θ̇r)}+Mg(hcg−hr)θr

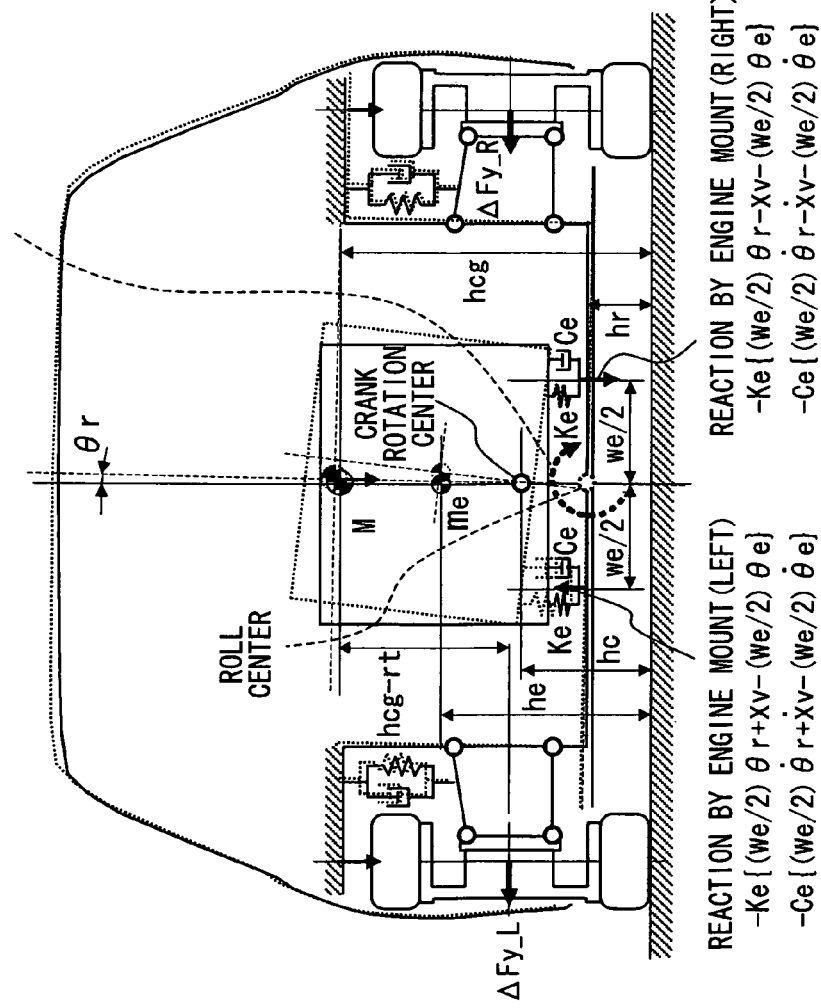

REACTION BY ENGINE MOUNT (LEFT)
−Ke{(we/2)θr+Xv−(we/2)θe}
−Ce{(we/2)θ̇r+Ẋv−(we/2)θ̇e}

REACTION BY ENGINE MOUNT (RIGHT)
−Ke{(we/2)θr−Xv−(we/2)θe}
−Ce{(we/2)θ̇r−Ẋv−(we/2)θ̇e}

VEHICLE CONTROL SYSTEM

CROSS REFERENCE TO RELATED APPLICATION

This application is based on and incorporates herein by reference Japanese Patent Application No. 2007-97791 filed on Apr. 3, 2007.

FIELD OF THE INVENTION

The present invention relates to a vehicle control system that suppresses vibrations which occur at various portions of a vehicle.

BACKGROUND OF THE INVENTION

US 2005/0049761 (JP 2004-168148A) discloses a vehicle control system that is capable of suppressing the vibrations of a vehicle body. The vehicle control system corrects an input instruction so as to suppress the vibrations of the vehicle by a motion model. The motion model is formed by a dynamic model of the vibrations of tires of the vehicle, the vehicle body unsprung vibrations in suspensions, and the vehicle body sprung vibration which are received by the vehicle body per se, which occurs according to an input instruction corresponding to at least one of accelerator operation, steering operation, and brake operation which are instructed by a driver.

The above vehicle control system uses a vehicle vibration model including a vehicle body sprung vibration model, a suspension vibration model and a tire model. The vehicle body vibrations make passengers most uncomfortable, and change the ground loads (ground pressures) of the respective wheels, thereby adversely affecting the basic performance of the vehicle such as traveling, curving or stopping. Accordingly, the vehicle control system mainly conducts the control for suppressing the vehicle body vibration.

For example, in the case of conducting the rapid accelerator operation, the behavior of the vehicle body above springs which is caused by a driving torque is calculated by the vehicle vibration model and the drive torque is so corrected as to reduce a pitch rate and a vertical velocity corresponding to the vehicle body behavior above springs. When the corrected drive torque is a negative value, because the control cannot be realized by the drive system, a target braking force for compensating the shortfall is calculated to execute the control in the braking system together.

However, because the vehicle body is mounted on a chassis frame, and the chassis frame is coupled with the tires through the suspensions, the chassis vibrations and the tire vibrations adversely affect the vibrations. Also, because the vibrations occur in the chassis or the tires to change the ground load of the tires, the travel stability of the vehicle may be deteriorated. For this reason, more than just suppressing of the vehicle body vibrations is needed. It is preferred to suppress the vibrations that occur at the respective portions of the vehicle.

SUMMARY OF THE INVENTION

It is therefore an object of the present invention to provide a vehicle control system, which is capable of suppressing vibrations that occur at various portions of the vehicle.

According to the present invention, a vehicle control system is constructed with first and second control units and first and second operation devices. The first control unit and the second control unit respectively store same vehicle vibration model that is separated into a vehicle body vibration model, a chassis vibration model and a tire vibration model to estimate vibration states of various portions of a vehicle. The first operation device and the second operation device are controlled by the first control unit and the second control unit, respectively, to change motion states of the vehicle. The first control unit and the second control unit receive same input parameters to be input to the vehicle vibration model and calculate estimated vibration states of respective portions of the vehicle, respectively. The first control unit and the second control unit share subject models to be controlled in vibration suppression among the vehicle body vibration model, the chassis vibration model and the tire vibration model. The first control unit and the second control unit calculate control quantities according to the vibration states in the subject models to control the first operation device and the second operation device.

BRIEF DESCRIPTION OF THE DRAWINGS

The above and other objects, features and advantages of the present invention will become more apparent from the following detailed description made with reference to the accompanying drawings. In the drawings:

FIG. 3 is a block diagram showing a vehicle vibration model and a controller in the vibration suppression control function unit;

FIG. 14 is a block diagram showing a functional structure of a bouncing vibration isolation control unit in the embodiment;

FIGS. 15A and 15B are explanatory diagrams showing a vehicle body vibration model formed for expressing the rolling vibration of the vehicle body and the rolling vibration of an engine in the embodiment, respectively;

DETAILED DESCRIPTION OF THE PREFERRED EMBODIMENT

Figure 1:
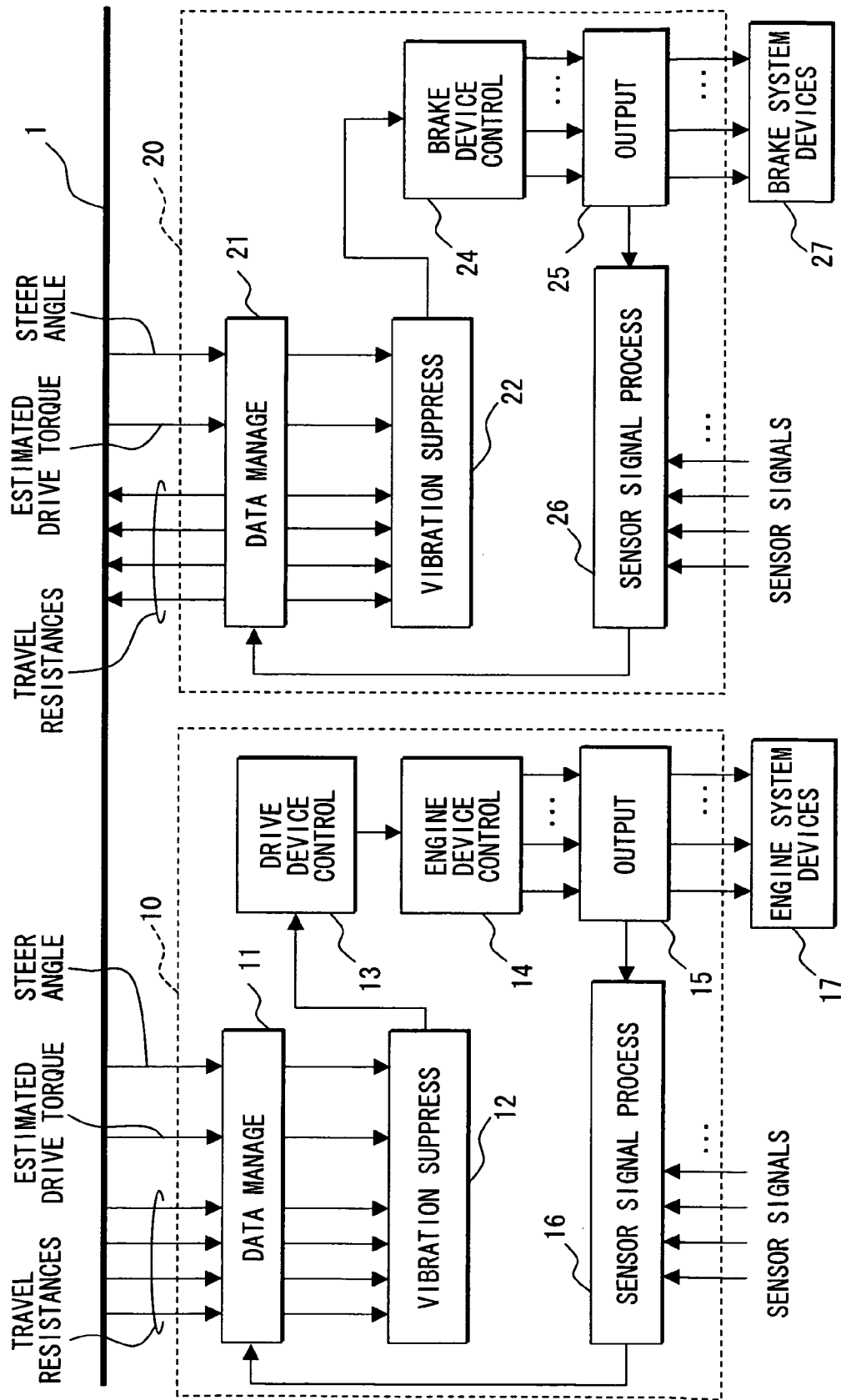
FIG. 1 is a block diagram showing a vehicle control system according to an embodiment of the present invention.

Referring first to FIG. 1, a vehicle control system according to an embodiment is mainly made up of an engine and (/) drive system control ECU 10 of an engine/drive system, and a brake system control ECU 20 of a brake system. The engine/drive system ECU 10 and the brake system ECU 20 are provided as a first control unit and a second control unit, respectively. These ECUs 10 and 20 can communicate with each other through an in-vehicle LAN 1, which is a communication network disposed within a vehicle, and also can communicate with other ECUs (not shown) such as a power steering control device.

The engine/drive system ECU 10 includes a data management unit 11. The data management unit 11 includes a communication interface function that manages the transmit and receive of data using the in-vehicle LAN 1. The data management unit 11 also includes a calculation function that calculates an estimated drive torque which is an input parameter necessary for simulating the vibrations that occur in an actual vehicle in a vehicle vibration model that will be described later based on various sensor signals applied to a sensor input signal processing unit 16.

More specifically, the data management unit 11 calculates an estimated net drive torque of driving wheels in transmitting the drive torque that is generated by the engine to driving wheels of the vehicle through a power transmission system including a transmission based on the wheel velocities of the respective wheels, the rotational speed of the engine, the rotational speed of a driving shaft, and the rotational speed ratio of an input shaft and an output shaft of the transmission.

The estimated drive torque that is calculated by the data management unit 11 is input to a vibration suppression control function unit 12 that stores a vehicle vibration model therein, and also transmitted to the brake system ECU 20. Also, the data management unit 11 receives travel resistance data of the respective wheels (four wheels) that is a parameter to be input to the vehicle vibration model from the brake system ECU 20, and then output the received travel resistance data to the vibration suppression control function unit 12. Further, the data management unit 11 receives, for example, steering angle data from the power steering ECU (not shown), and calculates a reaction force in the lateral (left-right) direction, which is exerted on the front wheels from a road surface when the vehicle turns, based on the steering angle to output the calculated reaction force to the vibration suppression control function unit 12. The calculation function of the reaction force in the lateral direction can be provided by any one of the data management unit 11 of the engine/drive system ECU 10 and the data management unit 21 of the brake system ECU 20. Also, it is possible that the calculation function is provided in the power steering ECU, and the data management units 11 and 21 receive the calculation result of the lateral reaction force from the power steering ECU.

Figure 2A:
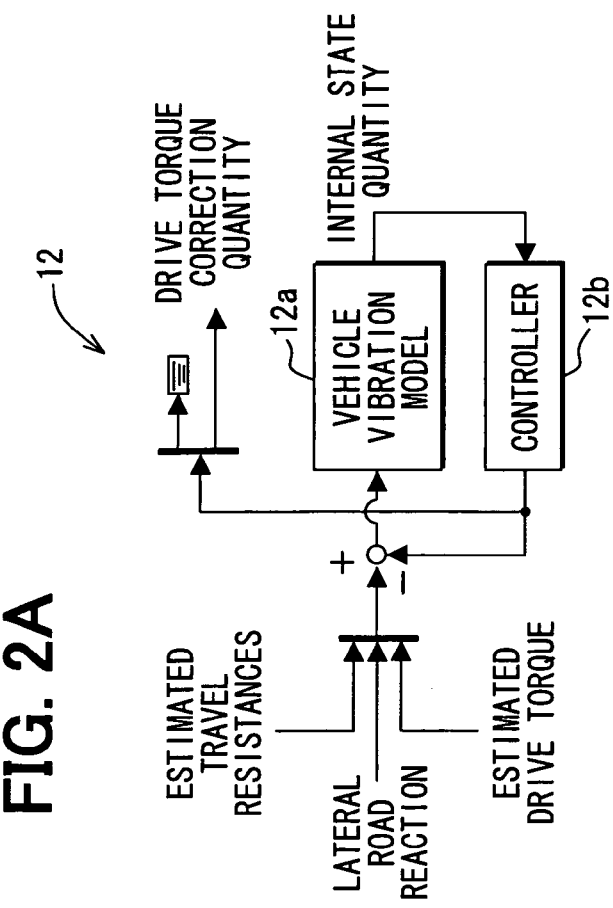
FIGS. 2A and 2B are structural diagrams showing a vibration suppression control function unit of an engine/driving system ECU and a brake system ECU in the embodiment, respectively.

The vibration suppression control function unit 12 estimates the motional states of various portions (a plurality of portions) in the vehicle, and also calculates a correction control quantity (drive torque correction quantity) for suppressing the vibrations that occur at the respective portions of the vehicle based on the estimated results to output the correction control quantity to the drive system device control unit 13. The structural diagram of the vibration suppression control function unit 12 is shown in FIG. 2A. As shown in FIG. 2A, the estimated drive torque, the estimated four wheel travel resistances, and the lateral road surface reaction force are input to a vehicle vibration model 12a. The vehicle vibration model calculates the motional states of the respective portions in the vehicle (vibrations that occur at the respective portions) as the internal state based on those inputs. The internal state quantity is output to a controller 12b, and the controller 12b multiplies the internal state quantity by a given feedback gain to calculate the drive torque correction quantity for suppressing the vibrations of the respective portions.

In this embodiment, the vehicle vibration model 12a is separated and hierarchized (formed in a hierarchical structure) into a vehicle body vibration model, a chassis vibration model and a tire vibration model. Then, the controller 12b of the vibration suppression control function unit 12 calculates a drive torque correction quantity according to the internal state quantity of the vehicle body vibration model among those models. The vibration suppression control function unit 12 in the engine/drive system ECU 10 corrects the drive torque that is applied to the driving wheels of the vehicle to suppress the vibrations (pitch, bounce, roll) which are generated in the vehicle body of the vehicle.

The drive system device control unit 13 calculates the drive torque to be generated in the drive shaft mainly according to the accelerator operation of the driver based on the accelerator operation of the driver (pedal depression quantity, pedal depression velocity), the travel velocity of the vehicle, and the gear ratio of the transmission in the vehicle. However, when the vehicle is equipped with a traction control system (TRC), a vehicle stability control system (VSC), or an adaptive cruse control system (ACC), and the output torque of the engine is controlled by those control systems, the basic drive torque is determined according to the control quantity caused by those control systems.

Then, the drive system device control unit 13 corrects the basic drive torque according to the drive torque correction quantity to calculate a final target drive torque to be generated in the drive shaft. The drive system device control unit 13 calculates the target generation torque of the engine so as to generate the calculated target drive torque.

In this situation, when a transmission such as an automatic transmission or a CVT which can automatically change the gear ratio is applied, the drive system device control unit 13 calculates the appropriate combination of the target gear ratio in the transmission with the target generation torque in the engine for generating the target drive torque. The target gear ratio is output to a transmission control device (not shown), and the target generation torque is output to an engine system operation device control unit (engine device control unit) 14.

Engine device control unit 14 calculates the control quantities and the control timings of the respective operation devices (throttle valve, fuel injection device, ignition coil, etc.) which are required to generate the target generation torque by the engine. More specifically, engine device control unit 14 calculates the air quantity to be supplied in the engine, the required fuel quantity to be supplied, and the ignition time. A combustion mode that depends on the various operating states and the limit condition such as the target air-fuel ratio are met by controlling the air, the fuel and the ignition. Then, the air system device operation quantity, the fuel system device operation quantity, and the ignition system device operation time are calculated according to the respective required values of the air, the fuel and the ignition system to output the calculated values to the drive instruction output unit 15 shown in FIG. 1. The drive instruction output unit 15 outputs the drive signals to the corresponding operation devices 17 of an engine system, which is a first device controlled by the ECU 10, according to the input operation quantity and the operation time.

As described above, the target generation torque that is determined taking the drive torque correction quantity for suppressing the vibrations of the vehicle body into consideration is applied to engine device control unit 14. Engine device control unit 14 is entrusted with the operation quantity of the respective operation devices for generating the target generation torque. As a result, the deterioration of a mileage in the engine and an increase in the emission can be suppressed as much as possible while the vibration of the vehicle is suppressed. Engine device control unit 14 can use not only an operation device that directly adjusts the operating state of the engine but also an operation device that is driven by the engine to indirectly control the operation of the engine. For example, a power generation load in an alternator that is driven by the engine can be actively operated to control the generated torque of the engine. As a result, even when the throttle valve, the injection quantity, and the ignition time are limited by the operating state of the engine, it is possible to control the generation torque of the engine.

The brake system ECU 20 has substantially the similar structure as that of the engine/drive system ECU 10. That is, even the brake system ECU 20 has a data management unit 21, and receives the input parameter to be input to a vibration suppression control function unit 22 by calculation or communication. The data management unit 21 of the brake system ECU 20 calculates the travel resistance of the wheel longitudinal (front-back) direction, which is exerted on the respective wheels from the road surface as the reaction force, based on the wheel velocities of the respective wheels which are input through a sensor input signal processing unit 26. This is because when the travel resistance reaction changes, there is the possibility that the vibrations occur in the tires.

The travel resistance not only changes due to the state of the road surface per se (irregularity, slope, friction coefficient, etc.), but also changes due to the braking force or a cornering drag. In any factor, when the travel resistance changes, the rotating velocity of the wheels slightly changes according to the changed travel resistance. Accordingly, it is possible to calculate the travel resistance in the wheel longitudinal direction based on the change ratio of the respective wheel velocities with a time (angular acceleration).

Figure 2B:
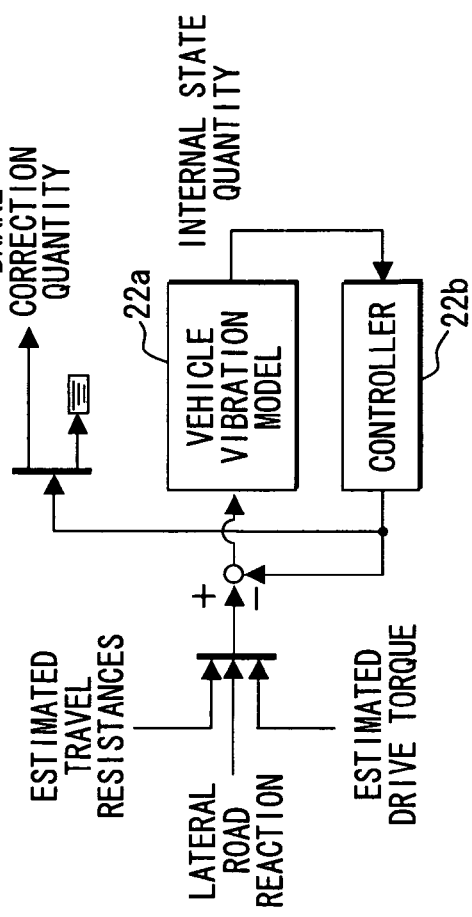

The vibration suppression control function unit 22 has a vehicle vibration model 22a that is separated and hierarchized (formed in hierarchical structure) into the same vehicle body vibration model, chassis vibration model and tire vibration model as those of the vibration suppression control function unit 12 as shown in FIG. 2B. The same input parameters as that input to the vehicle vibration model of the vibration suppression control function unit 12 are input to the vehicle vibration model. As a result, the operating states of the respective portions of the vehicle which are calculated by the respective vehicle vibration models of the vibration suppression control function unit 12 and the vibration suppression control function unit 22 as the internal state quantity coincide with each other.

A controller 22b in the vibration suppression control function unit 22 multiplies the internal state quantities of the chassis vibration model and the tire vibration model in the vehicle vibration model by a given feedback gain to calculate a braking force correction quantity for suppressing the vibrations of the chassis and the respective tires. That is, the vibration suppression control function unit 22 in the brake system ECU 20 appropriately corrects the braking forces of the respective wheels of the vehicle to suppress the vibrations that are generated in the chassis and the tires of the vehicle.

A brake system operation device control unit 24 calculates the braking force to be generated in the respective wheels as a basic braking force according to the brake operation of the driver based on the brake operation by the driver. However, when the vehicle is equipped with the TRC, VSC or an antilock brake control system (ABS), and the braking forces (brake fluid pressures) of the respective wheels are controlled by those control systems, the basic drive torque is determined according to the control quantity caused by those control systems.

Then, the brake system operation device control unit 24 corrects the basic drive torque according to the above braking force correction quantity to calculate a final target brake torque to be generated in the respective wheels. Also, the brake system operation device control unit 24 calculates the operation quantities and the operation times of the respective operation devices (pump, electromagnetic valve) 27 which are required to generate the target braking force to output the calculated values to a drive instruction output unit 25. The drive instruction output unit 25 outputs drive signals to corresponding operation devices 27 of the brake system as the second device, which is controlled by the ECU 20, according to the input operation quantity and operation time.

As described above, the roles are shared so that the vehicle body vibrations, the chassis vibrations, and the tire vibrations are suppressed by the control using the respective different operation devices. As a result, it is easy to execute the appropriate control for suppressing the respective vibrations.

Also, the engine/drive system ECU 10 and the brake system ECU 20 store the same vehicle vibration model therein, respectively. When the respective ECUs 10 and 20 conduct the control, the control is reflected to the vehicle vibration model provided in the respective ECUs 10 and 20. Accordingly, even if those ECUs 10 and 20 do not communicate the detailed information related to the respective controls with each other, the respective ECUs 10 and 20 can grasp the influence of the control by another ECU from the vehicle vibration model and can control the vibration suppression based on the grasped influence. When the respective ECUs 10 and 20 receive only the input parameter that is information to be input to the vehicle vibration model, those ECUs 10 and 20 can conduct the control concerted with each other. As a result, it is possible to reduce the communication quantity for obtaining the necessary information.

In particular, the engine/drive system ECU 10 calculates the estimated drive torque, and the brake system ECU 20 calculates the estimated travel resistances of the respective wheels. That is, the respective ECUs 10 and 20 calculate a part of the input parameter to be input to the vehicle vibration model by themselves, respectively. For this reason, the respective ECUs 10 and 20 need to obtain only the input parameter other than that calculated by themselves, thereby making it possible to further reduce the communication quantity.

Further, the engine/drive system ECU 10 suppresses the vehicle body vibrations under the control and the brake system ECU 20 suppresses the chassis vibrations and the tire vibrations under the control.

The vehicle body vibrations, the chassis vibrations, and the tire vibrations are different in the natural frequency (resonance frequency) due to a difference in the mass, respectively. More specifically, the vehicle body vibrations occur in a frequency range of about 1 to 2 Hz, the chassis vibrations occur in a frequency range of about 10 to 20 Hz, and the tire vibrations occur in a frequency range of about 20 to 40 Hz.

A period of time required to control the braking force, that is, a period of time required until the braking forces corresponding to the control instruction values are generated in the respective wheels is generally shorter than a period of time until the output torque of an internal combustion engine of the vehicle changes. Accordingly, the brake system ECU 20 controls the suppression of the chassis vibrations and the tire vibrations by the brake system operation device 27. Also, the engine/drive system ECU 10 controls the suppression of the vehicle body vibrations by the engine system operation device 17. As a result, it is possible to sufficiently suppress the vibrations of the chassis and the tires, which relatively quickly vibrate.

Subsequently, the vehicle vibration model used in this embodiment and the vibration suppression control using the vehicle vibration model are describe in more detail with reference to FIGS. 3 to 5. FIG. 3 shows the vehicle vibration model 12*a*, 22*a* and the controller 12*b*, 22*b* which are provided in the vibration suppression control function units 12 and 22 in detail. As shown in FIG. 3, the control system including the vehicle vibration model and the controller is separated into a tire control system 40, a chassis control system 50, and a vehicle body control system 60, respectively. With the above configuration, the vehicle vibration model is also separated into the tire vibration model, the chassis vibration model and the vehicle body vibration model, which are stored in the respective control systems 40 to 60.

In FIG. 3, each of the data management units 11 and 21 includes a four-wheel longitudinal direction travel resistance estimate unit 31 that calculates the estimated travel resistances of the respective four wheels in the longitudinal direction, a front-wheel lateral road surface reaction force estimate unit 32 that calculates the estimated lateral reaction force which is exerted on the front wheels from the road surface when the vehicle turns, and a drive torque estimate unit 33 that calculates the estimated drive torque which is transmitted to the rotary shaft of the driving wheels. However, FIG. 3 shows which input parameter is given to the respective control systems 40 to 60 for convenience. It is unnecessary that the individual data management units 11 and 21 include the four-wheel longitudinal direction travel resistance estimate unit 31, the front-wheel lateral road surface reaction force estimate unit 32, and the drive torque estimate unit 33.

The tire control system 40 includes a driving wheel tire longitudinal vibration estimate/control unit 41 having a driving wheel tire vibration model that expresses a motional state of the driving wheels in the longitudinal direction (rotating direction), which changes according to the drive torque that is given to the driving wheel rotating shaft from the drive system of the vehicle, and the travel resistance that is exerted on the driving wheels. The driving wheel tire longitudinal vibration estimate/control unit 41 calculates the braking force correction quantity for suppressing the longitudinal vibrations which are generated in the driving wheel tires by the driving wheel tire vibration model. Also, the tire control system 40 includes a driven (rolling) wheel tire longitudinal vibration estimate and (/) control unit 43 having a driven wheel tire vibration model that expresses the motional state of the driven wheel tire in the longitudinal direction, which changes according to the travel resistance that affects the driven wheels. The driven wheel tire longitudinal vibration estimate/control unit 43 calculates the braking force correction quantity for suppressing the longitudinal vibrations that are generated in the driven wheel tires by the driven wheel tire vibration model. Further, the tire control system 40 further includes a virtual intermediate coupling element longitudinal vibration estimate/control unit 42 having a virtual intermediate coupling element model that couples the driving wheel tire vibration model with the driven wheel tire vibration model. The virtual intermediate coupling element longitudinal vibration estimate/control unit 42 calculates the braking force correction quantity for suppressing the vibrations of the driving wheels and the driven wheels by the virtual intermediate coupling element model.

As described above, the tire vibration model and the chassis vibration model are separated from each other. However, when the driving wheels rotate by receiving the drive torque, a force (translational force) that moves in the longitudinal direction is generated in the driving wheel rotating shaft. The translational force of the driving wheels is internally propagated to the driven wheel side through the chassis in fact, and the translational force is generated in the driven wheel rotating shaft. In this way, the translational force that is exerted on the driving wheel rotating shaft from the driving wheels affects the motional state of the driven wheels. However, when the tire vibration model and the chassis vibration model are separated from each other, the force that is internally propagated from the driving wheel side to the driven wheel side cannot be dealt with.

Figure 4:
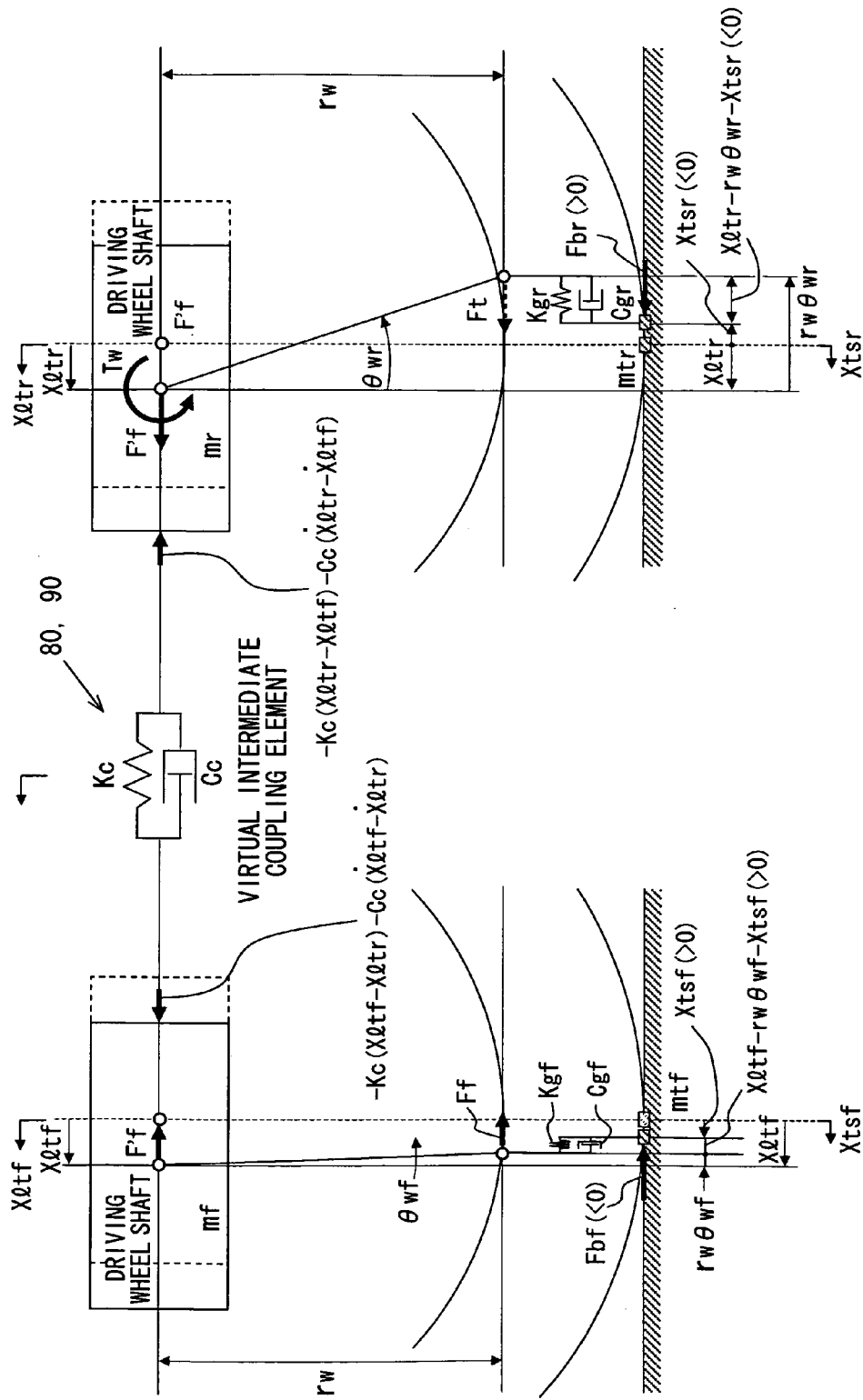
FIG. 4 is an explanatory diagram showing a tire vibration model in the embodiment.
Figure 5:
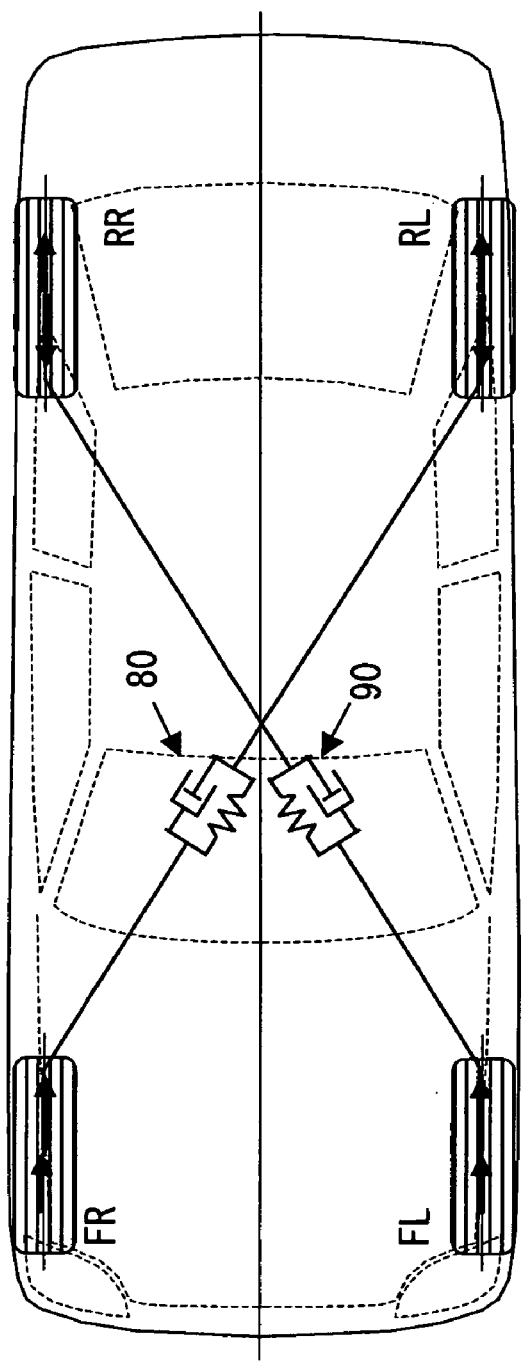
FIG. 5 is an explanatory diagram showing a coupling relationship of front and rear wheels due to a virtual intermediate coupling element in the tire vibration model.

For this reason, in this embodiment, as shown in FIG. 4, virtual intermediate coupling element models 80 and 90 that are imaginary are set between the driving wheel tire vibration model and the driven wheel tire vibration model and a phase relationship between the behavior of the driving wheels and the behavior of the driven wheels is operated by the virtual intermediate coupling element models 80 and 90. With the above configuration, the vibrations that are generated in the driving wheel tires and the driven wheel tires can be simulated with high precision while the tire vibration model and the chassis vibration model are separated from each other. The virtual intermediate coupling element models 80 and 90 are defined as elements simply made up of a spring Kc and a damper Cc. This is because elastic deformation members such as a suspension bushing and a chassis frame are interposed between the driving wheel rotating shaft and the driven wheel rotating shaft, but when those members are considered as integration, those members can be regarded as simple elements made up of the spring Kc and the damper Cc as described above.

Also, when the vehicle is turning, the ground load of the rotating inner wheels is decreased, and the ground load of the rotating outer wheels is increased. Therefore, the behaviors of the right and left wheels are largely different between the rotating inner wheel and the rotating outer wheel. Accordingly, in the case of forming a model that couples the front wheels (driven wheels) and the rear wheels (driving wheels), as shown in FIG. 5, it is preferable that the front right wheel (FR wheel) and the rear left wheel (RL wheel) are coupled by the virtual intermediate coupling element model 80, and the front left wheel (FL wheel) and the rear right wheel (RR wheel) are coupled by the virtual intermediate coupling element model 90. The respective systems that couple the front and rear wheels can also appropriately simulate the vibration state when the vehicle turns, and can prevent the correction quantity that impedes the travel stability and the turning property of the vehicle from being calculated. This is similarly applied to the chassis vibration model or the vehicle body vibration model which will be described later. Even when a model that the front wheel and the rear wheel at the right side are coupled with each other, and a model that the front wheel and the rear wheel at the left side are coupled with each other, it is possible to suppress the tire vibrations.

Specific motion equations related to the driving wheel tire vibration model, the driven wheel tire vibration model and the virtual intermediate coupling element models 80 and 90 shown in FIG. 4 will be described below.

First, the vibration generation mechanism in the longitudinal direction (rotating direction) of the tires will be described below. In the case of the driving wheels, even if the wheels rotate, because the tires receive the resistance by a frictional force of the road surface, the tire is twisted in the rotating direction and elastically deformed. Also, in the case of the driven wheels, because the vehicle body is going to move in the longitudinal direction by the translational force caused by the driving wheels, the tires are going to rotate by the frictional force of the road surface. However, because the axle of the driven wheels is going to keep the state by an inertia force, the tires are similarly twisted and elastically deformed. The elastic deformation causes a restoring force to be generated in the tires, and the tires are twisted back. This phenomenon is repeated, thereby generating the vibrations in the longitudinal direction (rotating direction) of the tires.

In the driving wheel tire vibration model, basic equations that are bases for calculating the motional equations for expressing the above vibrations taking the virtual intermediate coupling element model into consideration are represented by Expression 1 to Expression 4.

$$F_t = F'_t = -K_{gr}(x_{ltr} - r_w\theta_{wr} - x_{tsr}) - C_{gr}(\dot{x}_{ltr} - r_w\dot{\theta}_{wr} - \dot{x}_{tsr}) \quad (>0) \qquad \text{(Ex. 1)}$$

$$I_w\ddot{\theta}_{wr} = -r_wK_c(x_{ltr} - x_{ltf}) - r_wC_c(\dot{x}_{ltr} - \dot{x}_{ltf}) - r_wF_t + T_w \qquad \text{(Ex. 2)}$$

$$m_r\ddot{x}_{ltr} = -K_c(x_{ltr} - x_{ltf}) - C_c(\dot{x}_{ltr} - \dot{x}_{ltf}) + F'_t \qquad \text{(Ex. 3)}$$

$$m_{tr}\ddot{x}_{tsr} = -K_{gr}\{x_{tsr} - (x_{ltr} - r_w\theta_{wr})\} - C_{gr}\{\dot{x}_{tsr} - (\dot{x}_{tsr} - r_w\dot{\theta}_{wr})\} + F_{br} \qquad \text{(Ex. 4)}$$

In the above Expressions:

$F_t$ is a translational force that pushes the driving shaft forwardly of the vehicle body by the road surface reaction force that is received by the tires;

$F'_t$ is a counteracting force ($=F_t$) by which the driving wheel rotating shaft is pushed back in the rear of the vehicle body;

$K_{gr}$ is a twist rigidity of the driving wheel tires in the rotating direction;

$x_{ltr}$ is the amount of displacement of the driving wheel rotating shaft on the ground fixed coordinate base;

$r_w$ is a wheel radius;

$\theta_{wr}$ is a relative twist angle in the rotating direction of the driving wheels and tires;

$x_{tsr}$ is the amount of displacement in the vehicle body longitudinal direction at a driving wheel tire road surface ground point;

$C_{gr}$ is a twist attenuation coefficient in the rotating direction of the driving wheel tire;

$I_w$ is a rotary inertia moment of the wheels;

$K_c$ is a spring rigidity of the virtual intermediate coupling element;

$x_{ltf}$ is the amount of displacement of the driven wheel (front wheel) rotating shaft on the ground fixed coordinate base;

$C_c$ is an attenuation coefficient of the virtual intermediate coupling element;

$T_w$ is a drive torque that is exerted on the driving wheel rotating shaft;

$m_r$ is a driving wheel unsprung mass;

$m_{tr}$ is a mass of the virtual microscopic element at a ground point between the driving wheel tire and the road surface; and $F_{br}$ is a travel resistance that affects the driving wheel tire ground point.

Also, in the driven wheel tire vibration model, basic equations that are bases for calculating the motional equations for expressing the above vibrations taking the virtual intermediate coupling element model into consideration are represented by Expression 5 to Expression 8.

$$F_f = K_{gf}(x_{ltf} - r_w\theta_{wf} - x_{tsf}) - C_{gf}(\dot{x}_{ltf} - r_w\dot{\theta}_{wf} - \dot{x}_{tsf}) \quad (<0) \qquad \text{(Ex. 5)}$$

$$I_w\ddot{\theta}_{wf} = -r_wK_c(x_{ltf} - x_{ltr}) - r_wC_c(\dot{x}_{ltf} - \dot{x}_{ltr}) - r_wF_f \qquad \text{(Ex. 6)}$$

$$m_f\ddot{x}_{ltf} = -K_c(x_{ltf} - x_{ltr}) - C_c(\dot{x}_{ltf} - \dot{x}_{ltr}) + F'_f \qquad \text{(Ex. 7)}$$

$$m_{tf}\ddot{x}_{tsf} = -K_{gf}\{x_{tsf} - (x_{ltf} - r_w\theta_{wf})\} - C_{gf}\{\dot{x}_{tsf} - (\dot{x}_{ltf} - r_w\dot{\theta}_{wf})\} + F_{bf} \qquad \text{(Ex. 8)}$$

In the above expressions:

$F_f$ is a translational force backward in a wheel end tangent direction due to the travel resistance that is received by the driven wheel (front wheel) tires;

$F'_f$ is a translational force ($=F_f$) by which the driven wheel rotating shaft pushes back the vehicle body backward by $F_f$;

$K_{gf}$ is a twist rigidity of the driven wheel tires in the rotating direction;

$\theta_{wf}$ is a relative twist angle in the rotating direction of the driven wheels and tires;

$x_{tsf}$ is the amount of displacement in the vehicle body longitudinal direction at a driven wheel tire road surface ground point (the amount of slip between the tire and road surface);

$C_{gf}$ is a twist attenuation coefficient in the rotating direction of the driven wheel tire;

$m_f$ is a driven wheel unsprung mass;

$m_{tf}$ is a mass of the virtual microscopic element at a ground point between the driven wheel tire and the road surface; and $F_{bf}$ is a travel resistance that affects the driven wheel tire ground point.

When the amount of displacement of the virtual intermediate coupling element is defined as $x_I$, the amount of displacement $x_I$ corresponds to a difference between the amount of displacement $x_{ltf}$ of the driven wheel (front wheel) rotating shaft and the amount of displacement $x_{ltr}$ of the driving wheel (rear wheel) rotating shaft. As a result, a motion equation represented by the following Expression 9 is obtained by the above basic expression.

$$\ddot{x}_I = -(K_c/m_f + K_c/m_r)x_I - (C_c/m_f + C_c/m_r)\dot{x}_I - K_{gf}/m_f x_{wf} - C_{gf}/m_f \dot{x}_{wf} + K_{gr}/m_r x_{wr} + C_{gr}/m_r \dot{x}_{wr} \qquad \text{(Ex. 9)}$$

Also, when the amount of relative displacement in the vehicle body longitudinal direction between the driven wheel rotating shaft and the driven wheel tire road surface ground point is defined as $x_{wf}$, because the amount of relative displacement $X_{wf} = x_{ltf} - r_w\theta_{wf} - x_{tsf}$ is satisfied, a motion equation of the following Expression 10 is obtained by the above basic equation.

$$\ddot{x}_{wf} = -(K_c/m_f - r_w^2K_c/I_w)x_I - (C_c/m_f - r_w^2C_c/I_w)\dot{x}_I - (K_{gf}/m_f + r_w^2K_{gf}/I_w + K_{gf}/m_{tf})x_{wf} - (C_{gf}/m_f + r_w^2C_{gf}/I_w + C_{gf}/m_{tf})\dot{x}_{wf} - (1/m_{tf})F_{bf} \qquad \text{(Ex. 10)}$$

Further, the amount of relative displacement in the vehicle body longitudinal direction between the driving wheel rotating shaft and the driving wheel tire road surface ground point is defined as $x_{wr}$, because the amount of relative displacement $X_{wr} = x_{ltr} - r_w\theta_{wr} - x_{tsr}$ is satisfied, a motion equation of the following Expression 11 is obtained by the above basic equation.

$$\ddot{x}_{wr} = (K_c/m_r - r_w^2K_c/I_w)x_I + (C_c/m_r - r_w^2C_c/I_w)\dot{x}_I - (K_{gr}/m_r + r_w^2K_{gr}/I_w + K_{gr}/m_{tr})x_{wr} - (C_{gr}/m_r + r_w^2C_{gr}/I_w + C_{gr}/m_{tr})\dot{x}_{wr} - (1/m_{tr})F_{br} - (r_w/I_w)T_w \qquad \text{(Ex. 11)}$$

where the state variables $x_1$ to $x_6$ and $u_1$ to $u_3$ are defined by the following Expression 12.

$$x_1=x_l,\ x_2=\dot{x}_l,\ x_3=x_{wf},\ x_4=\dot{x}_{wf},\ x_5=x_{wr},\ x_6=\dot{x}_{wr},\ u_1=F_{bf},$$
$$u_2=F_{br},\ u_3=T_w \qquad \text{(Ex. 12)}$$

Then, the respective first-order differentials of the state variables $x_1$ to $x_6$ can be expressed by Expressions 13 to 18.

$$\dot{x}_1=\dot{x}_l=x_2 \qquad \text{(Ex. 13)}$$

$$\dot{x}_2=\ddot{x}_l=-(K_c/m_f+K_c/m_r)x_l-(C_c/m_f+C_c/m_r)\dot{x}_l-K_{gf}/m_f x_{wf}-$$
$$C_{gf}/m_f \dot{x}_{wf}+K_{gr}/m_r x_{wr}+C_{gr}/m_r \dot{x}_{wr}=c_1 x_1+c_2 x_2+$$
$$c_3 x_3+c_4 x_4+c_5 x_5+c_6 x_6 \qquad \text{(Ex. 14)}$$

$$\dot{x}_3 = \dot{x}_{wf} = x_4 \qquad \text{(Ex. 15)}$$

$$\dot{x}_4 = \ddot{x}_{wf} = -(K_c/m_f - r_w^2 K_c/I_w)x_l - (C_c/m_f - r_w^2 C_c/I_w)\dot{x}_l - \qquad \text{(Ex. 16)}$$
$$(K_{gf}/m_f + r_w^2 K_{gf}/I_w + K_{gf}/m_{tf})x_{wf} -$$
$$(C_{gf}/m_f + r_w^2 C_{gf}/I_w + C_{gf}/m_{tf})\dot{x}_{wf} - (1/m_{tf})F_{bf}$$
$$= d_1 x_1 + d_2 x_2 + d_3 x_3 + d_4 x_4 + q_1 u_1$$

$$\dot{x}_5 = \dot{x}_{wr} = x_6 \qquad \text{(Ex. 17)}$$

$$\dot{x}_6 = \ddot{x}_{wr} = -(K_c/m_r - r_w^2 K_c/I_w)x_l - (C_c/m_r - r_w^2 C_c/I_w)\dot{x}_l - \qquad \text{(Ex. 18)}$$
$$(K_{gr}/m_r + r_w^2 K_{gr}/I_w + K_{gr}/m_{tr})x_{wr} -$$
$$(C_{gr}/m_r + r_w^2 C_{gr}/I_w + C_{gr}/m_{tr})\dot{x}_{wr} - (1/m_{tr})F_{br} -$$
$$(r_w/I_w)T_w$$
$$= e_1 x_1 + e_2 x_2 + e_5 x_5 + e_6 x_6 + q_2 u_2 + q_3 u_3$$

The above Expressions 13 to 18 are put together to obtain a state equation represented by the following Expression 19, which corresponds to the driving wheel tire vibration model, the rolling tire vibration model and the virtual intermediate coupling model.

$$\begin{bmatrix} dx_1/dt \\ dx_2/dt \\ dx_3/dt \\ dx_4/dt \\ dx_5/dt \\ dx_6/dt \end{bmatrix} = \qquad \text{(Ex. 19)}$$

$$\begin{bmatrix} 0 & 1 & 0 & 0 & 0 & 0 \\ c_1 & c_2 & c_3 & c_4 & c_5 & c_6 \\ 0 & 0 & 0 & 1 & 0 & 0 \\ d_1 & d_2 & d_3 & d_4 & 0 & 0 \\ 0 & 0 & 0 & 0 & 0 & 1 \\ e_1 & e_2 & 0 & 0 & e_5 & e_6 \end{bmatrix} \begin{bmatrix} x_1 \\ x_2 \\ x_3 \\ x_4 \\ x_5 \\ x_6 \end{bmatrix} + \begin{bmatrix} 0 & 0 & 0 \\ 0 & 0 & 0 \\ 0 & 0 & 0 \\ q_1 & 0 & 0 \\ 0 & 0 & 0 \\ 0 & q_2 & q_3 \end{bmatrix} \begin{bmatrix} u_1 \\ u_2 \\ u_3 \end{bmatrix}$$

$$c_1 = -(K_c/m_f + K_c/m_r) \quad d_1 = -(K_c/m_f - r_w^2 K_c/I_w)$$
$$c_2 = -(C_c/m_f + C_c/m_r) \quad d_2 = -(C_c/m_f - r_w^2 C_c/I_w)$$
$$c_3 = -K_{gf}/m_f \qquad d_3 = -(K_{gf}/m_f - r_w^2 K_{gf}/I_w + K_{gf}/m_{tf})$$
$$c_4 = -C_{gf}/m_f \qquad$$
$$c_5 = K_{gr}/m_r \qquad d_4 = -(C_{gf}/m_f - r_w^2 C_{gf}/I_w + C_{gf}/m_{tf})$$
$$c_6 = C_{gr}/m_r$$

-continued $$e_1 = (K_c/m_r - r_w^2 K_c/I_w) \qquad q_1 = -1/m_{tf}$$
$$e_2 = (C_c/m_r - r_w^2 C_c/I_w) \qquad q_2 = -1/m_{tr}$$
$$e_5 = (K_{gr}/m_r + r_w^2 K_{gr}/I_w + K_{gr}/m_{tr}) \quad q_3 = -r_w/I_w$$
$$e_6 = (C_{gr}/m_r + r_w^2 C_{gr}/I_w + C_{gr}/m_{tr})$$

A relative displacement velocity $dx_{wf}/dt$ that is the first-order differential of the amount of relative displacement $x_{wf}$ in the vehicle body longitudinal direction between the driven wheel rotating shaft and the driven wheel tire road surface ground point can be applied as the internal state quantity that expresses the longitudinal vibrations of the driven wheel (front wheel) tires. The relative displacement velocity is expressed by the following Expression 20 based on the state equation of Expression 19.

$$y_1 = dx_{wf}/dt = x_4 = [0\ 0\ 0\ 1\ 0\ 0] \begin{bmatrix} x_1 \\ x_2 \\ x_3 \\ x_4 \\ x_5 \\ x_6 \end{bmatrix} \qquad \text{(Ex. 20)}$$

Also, a relative displacement velocity $dx_{wr}/dt$ that is the first-order differential of the amount of relative displacement $x_{wr}$ in the vehicle body longitudinal direction between the driving wheel rotating shaft and the driving wheel tire road surface ground point can be applied as the internal state quantity that expresses the longitudinal vibrations of the driving wheel (rear wheel) tires. The relative displacement velocity is expressed by the following Expression 21 based on the state equation of Expression 19.

$$y_2 = dx_{wr}/dt = x_6 = [0\ 0\ 0\ 0\ 0\ 1] \begin{bmatrix} x_1 \\ x_2 \\ x_3 \\ x_4 \\ x_5 \\ x_6 \end{bmatrix} \qquad \text{(Ex. 21)}$$

Further, a displacement velocity $dx_l/dt$ that is the first-order differential of the amount of displacement $x_l$ of the virtual intermediate coupling elements 80 and 90 can be applied as the internal state quantity that expresses the longitudinal vibrations of the virtual intermediate coupling elements 80 and 90. The relative displacement velocity is expressed by the following Expression 22 based on the state equation of Expression 19.

$$y_3 = dx_l/dt = x_2 = [0\ 1\ 0\ 0\ 0\ 0] \begin{bmatrix} x_1 \\ x_2 \\ x_3 \\ x_4 \\ x_5 \\ x_6 \end{bmatrix} \qquad \text{(Ex. 22)}$$

Figure 6:
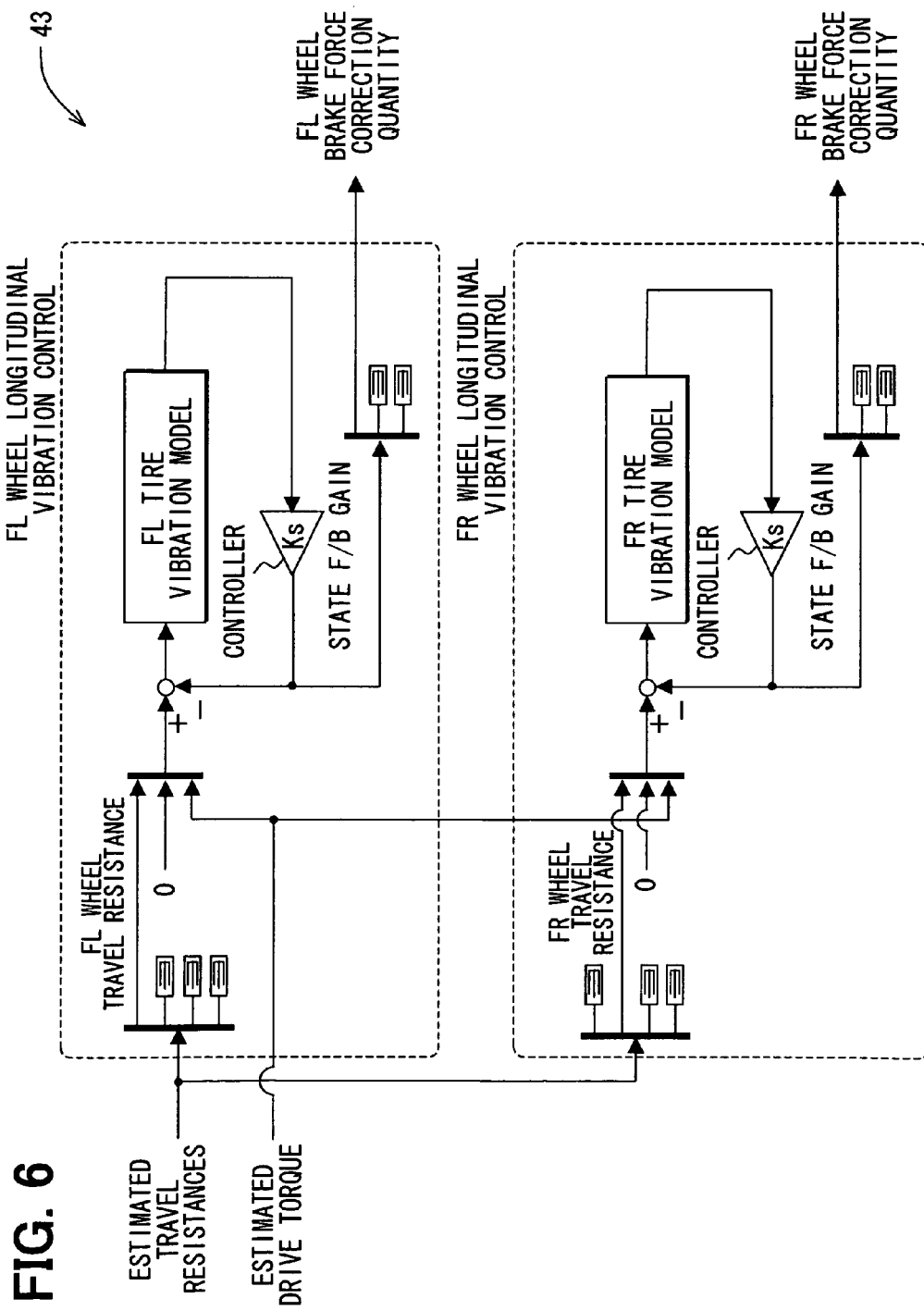
FIG. 6 is a block diagram showing a functional structure in a rolling tire longitudinal vibration estimate/control unit of a tire control system in the embodiment.

The driven wheel tire longitudinal vibration estimate/control unit 43 in the tire control system 40 of FIG. 3 outputs the relative displacement velocity $y_1$ that is calculated according to the above Expression 20 as the internal state quantity to the controller with respect to the front right and left wheels as shown in FIG. 6. The controller multiplies a given state feedback gain Ks by the relative displacement velocity $y_1$ to calculate the braking force correction quantity. In this situation, the state feedback gain Ks is set so that the relative displacement velocity $y_1$ can rapidly approach zero. The braking force correction quantity is input to the tire vibration model by feedback, and also output to a tire vibration correction braking force calculation unit 44 as the braking force correction quantity of the respective front right and left wheels.

Figure 7:
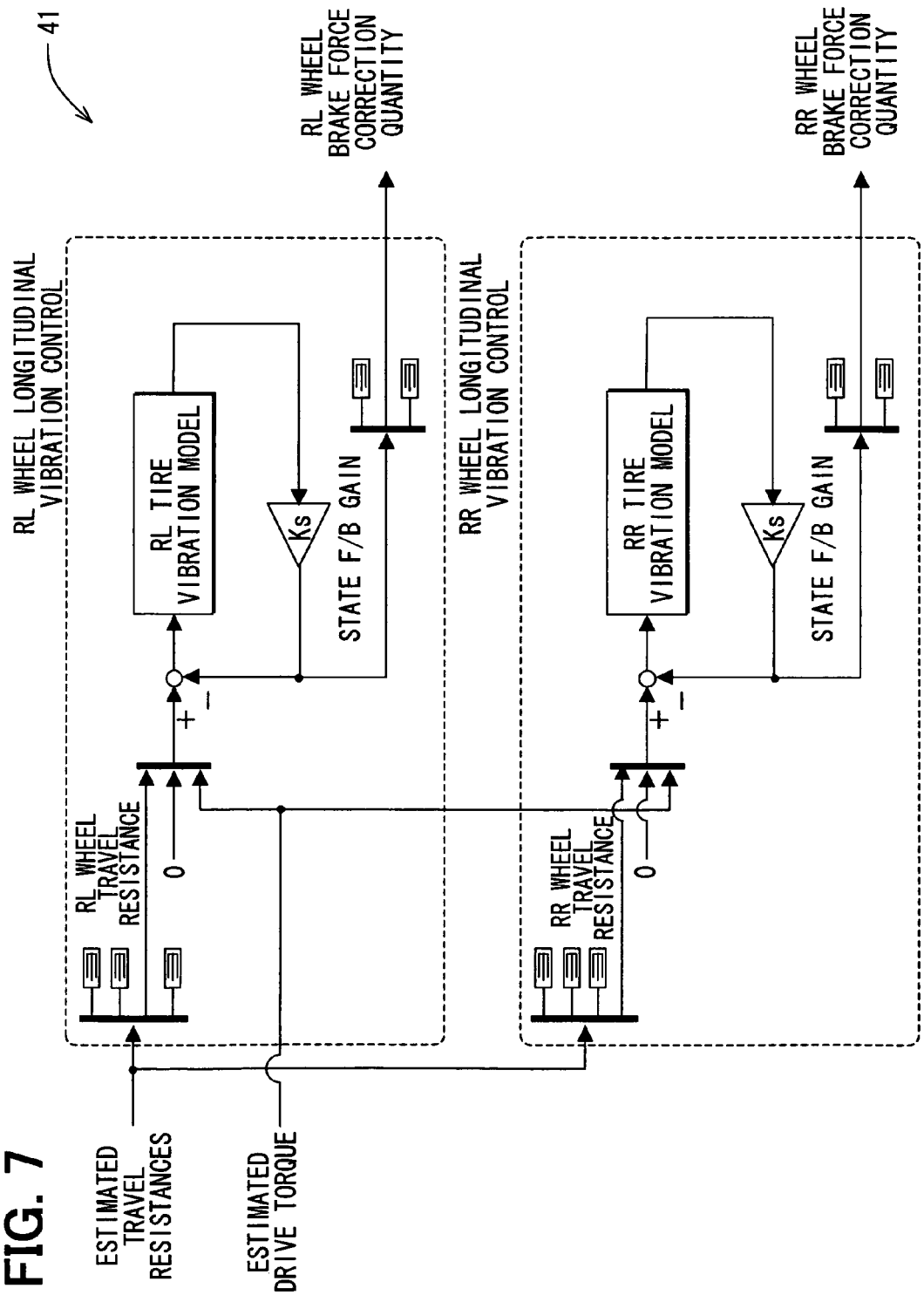
FIG. 7 is a block diagram showing a functional structure in a driving wheel tire longitudinal vibration estimate/control unit of the tire control system.

Also, the driving wheel tire longitudinal vibration estimate/control unit 41 in the tire control system 40 outputs the relative displacement velocity $y_2$ that is calculated according to the above Expression 21 as the internal state quantity to the controller with respect to the rear right and left wheels as shown in FIG. 7. The controller multiplies the given state feedback gain Ks by the relative displacement velocity $y_2$ to calculate the braking force correction quantity. The braking force correction quantity is input to the tire vibration model by feedback, and also output to the tire vibration correction braking force calculation unit 44 as the braking force correction quantity of the respective rear right and left wheels.

Figure 8:
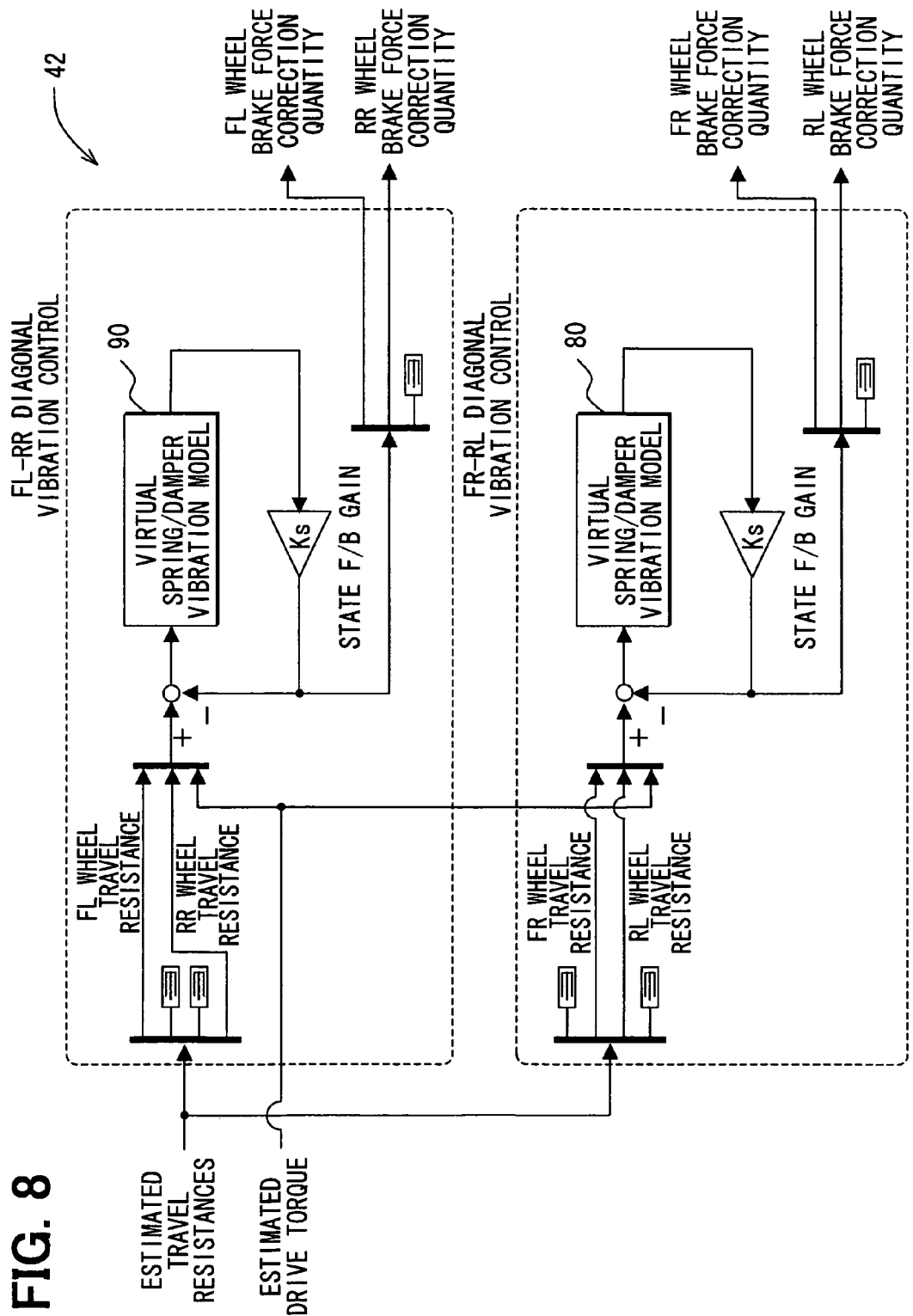
FIG. 8 is a block diagram showing a functional structure in the virtual intermediate coupling element longitudinal vibration estimate/control unit of the tire control system.

Further, the virtual intermediate coupling element longitudinal vibration estimate/control unit 42 in the tire control system 40 outputs the displacement velocity $y_3$ that is calculated according to the above Expression 22 as the internal state quantity to the controller with respect to a pair of FL wheel and RR wheel and a pair of FR wheel and RL wheel as shown in FIG. 8, respectively. The controller multiplies the given state feedback gain Ks by the relative displacement velocity $y_3$ to calculate the braking force correction quantity. The braking force correction quantity is input to the virtual intermediate coupling element model by feedback in each of the pairs, and also output to the tire vibration correction braking force calculation unit 44 as the braking force correction quantities with respect to the FL wheel and the RR wheel and the FR wheel and the RL wheel.

In the braking force correction quantity that is calculated by the virtual intermediate coupling element longitudinal vibration estimate/control unit 42, the sign can be inverted and then output to the tire vibration correction braking force calculation unit 44. When the sign of the braking force correction quantity is inverted, the vibrations of the virtual intermediate coupling elements 80 and 90 are not suppressed, but conversely, the braking force is connected so that the vibrations are excited.

However, as described above, the virtual intermediate coupling elements 80 and 90 is imaginary and merely virtual. Accordingly, even if the braking force is so corrected as to vibrate the virtual intermediate coupling elements 80 and 90, the vibrations do not become actually larger. Rather, when the braking force is so corrected as to vibrate the virtual intermediate coupling elements 80 and 90, thereby making it possible to shift the natural frequencies in the transmission system made up of the FL wheel and the RR wheel and the transmission system made up of the FR wheel and the RL wheel to the lower frequency side. As a result, the vibrations in the transmission systems can be isolated.

The tire vibration correction braking force calculation unit 44 sums up the braking force correction quantities in the FL wheel, the RR wheel, the FR wheel and the RL wheel to calculate the braking force correction quantities with respect to the respective wheels. It is preferable to calculate the braking force correction quantities in each of the individual wheels. Alternatively, for example, the front right and left wheels, and the rear right and left wheels are paired, respectively, to calculate the common braking force correction quantities. Similarly, with the above configuration, the tire vibrations can be suppressed to some degree. In this way, the tire vibrations are suppressed, thereby making it possible to obtain the advantages such that the rigidity feeling of the tires is improved.

Subsequently, the chassis control system 50 in FIG. 3 will be described. As shown in FIG. 3, the chassis control system 50 includes a chassis longitudinal vibration estimate/control unit 51 having the chassis vibration model that inputs the reaction force in the translational direction which is received by the front wheel shaft and the rear wheel shaft, and expresses the motional state in the longitudinal direction of the chassis. The chassis longitudinal vibration estimate/control unit 51 calculates the braking force correction quantity for suppressing the vibrations of the chassis in the longitudinal direction.

A specific motion equation related to the chassis vibration model will be described with reference to FIG. 9. The chassis has the longitudinal flexible rigidity of the suspension arm, and the rigidity of the frame and the bushing as the inner vibration element. For this reason, the inner vibration elements (elastic elements) at the respective portions of the chassis is approximated by simple spring and damper elements as a whole, and those elements are disposed between the front wheel shaft, the rear wheel shaft and chassis frame.

Figure 9:
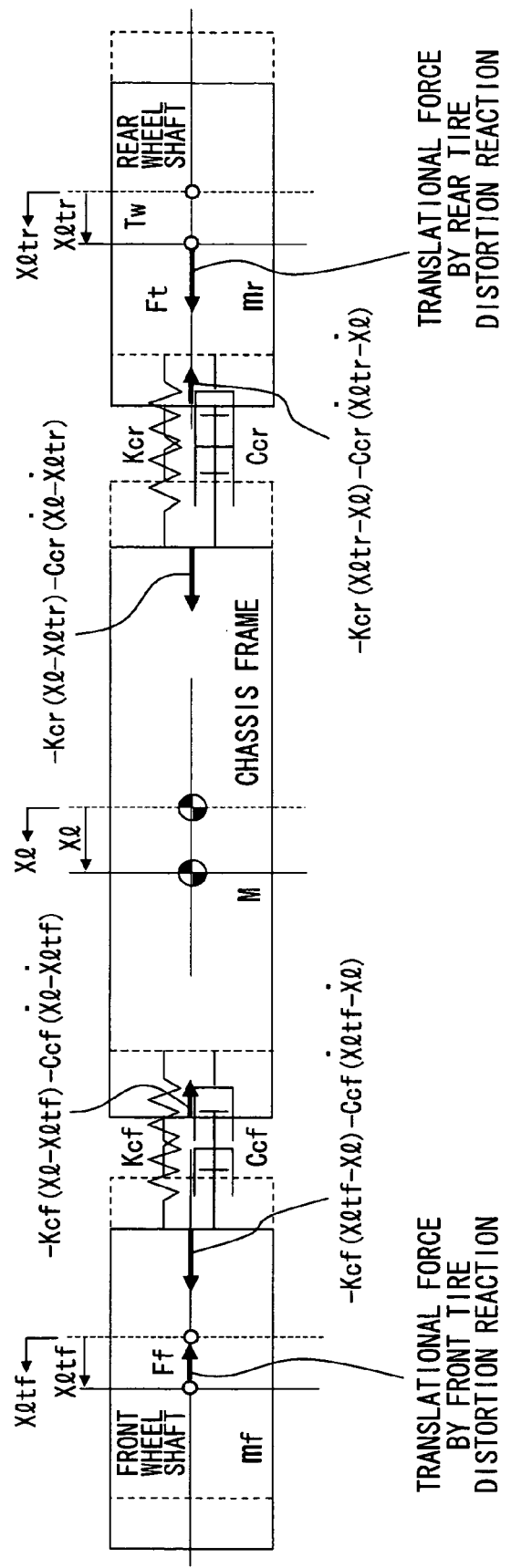
FIG. 9 is an explanatory diagram for explaining a chassis vibration model in the embodiment.

FIG. 9 is a model diagram showing the chassis vibration model that is made up of the above concept. Basic equations that are bases for calculating the motional equations for expressing the longitudinal vibrations in the chassis vibration model are represented by Expression 23 to Expression 25. Expression 23 is an equation related to the chassis frame, Expression 24 is an equation related to the front wheel shaft, and Expression 25 is an equation related to the rear wheel shaft.

$$M\ddot{x}_l = -K_{cf}(x_l - x_{ltf}) - C_{cf}(\dot{x}_l - \dot{x}_{ltf}) - K_{cr}(x_l - x_{ltr}) - C_{cr}(\dot{x}_l - \dot{x}_{ltr}) \quad \text{(Ex. 23)}$$

$$m_f\ddot{x}_{ltf} = -K_{cf}(x_{ltf} - x_l) - C_{cf}(\dot{x}_{ltf} - \dot{x}_l) + F_f \quad \text{(Ex. 24)}$$

$$m_r\ddot{x}_{ltr} = -K_{cr}(x_{ltr} - x_l) - C_{cr}(\dot{x}_{ltr} - \dot{x}_l) + F_t \quad \text{(Ex. 25)}$$

In the above expressions:
M is a mass of the chassis frame;
$x_l$ is the amount of displacement of the chassis frame on the ground fixed coordinate base;
$K_{cf}$ is a spring rigidity in the longitudinal direction between the front wheel shaft and the chassis frame;
$x_{ltf}$ is the amount of displacement of the front wheel shaft on the ground fixed coordinate base;
$C_{cf}$ is an attenuation coefficient in the longitudinal direction between the front wheel shaft and the chassis frame;
$K_{cr}$ is a spring rigidity in the longitudinal direction between the rear wheel shaft and the chassis frame;
$x_{ltr}$ is the amount of displacement of the rear wheel on the ground fixed coordinate base;
$C_{cr}$ is an attenuation coefficient in the longitudinal direction between the rear wheel and the chassis frame; $m_f$ is a front wheel unsprung mass;
$F_f$ is a translational force that is propagated to the front wheel shaft from the front wheel tires; $m_r$ is a rear wheel unsprung mass; and
$F_f$ is a translational force that is propagated to the rear wheel shaft from the rear wheel tires.

In the above expression, when the amount of relative displacement between the front wheel shaft and the chassis frame is defined as $x_{lf}$ the amount of relative displacement $x_{lf}$ corresponds to a difference between the amount of displacement $x_l$ of the chassis frame and the amount of displacement $x_{ltf}$ of the front wheel shaft. As a result, a motion equation represented by the following Expression 26 is obtained by the above basic expression.

$$\ddot{x}_{lf} = \ddot{x}_l - \ddot{x}_{ltf} = -K_{cf}(1/M+1/m_f)x_{lf} - C_{cf}(1/M+1/m_f)\dot{x}_{lf} - K_{cr}/Mx_{lr} - C_{cr}/M\dot{x}_{lr} - (1/m_f)F_f \quad \text{(Ex. 26)}$$

Also, when the amount of relative displacement between the rear wheel shaft and the chassis frame is defined as $x_{lr}$, the amount of relative displacement $x_{lr}$ corresponds to a difference between the amount of displacement $x_l$ of the chassis frame and the amount of displacement $x_{ltr}$ of the rear wheel shaft. As a result, a motion equation represented by the following Expression 27 is obtained by the above basic expression.

$$\ddot{x}_{lr} = \ddot{x}_l - \ddot{x}_{ltr} = -K_{cf}/Mx_{lf} - C_{cf}/M\dot{x}_{lf} - K_{cr}(1/M+1/m_r)x_{lr} - C_{cr}(1/M+1/m_r)\dot{x}_{lr} - (1/m_r)F_t \quad \text{(Ex. 27)}$$

where the state variables $x_1$ to $x_4$ and $u_1$ and $u_2$ are defined by the following Expression 28.

$$x_1 = x_{lf}, x_2 = \dot{x}_{lf}, x_3 = x_{lr}, x_4 = \dot{x}_{lr}, u_1 = F_f, u_2 = F_t \quad \text{(Ex. 28)}$$

Then, the respective first-order differentials of the state variables $x_1$ to $x_4$ can be expressed by Expressions 29 to 32.

$$\dot{x}_1 = \dot{x}_{lf} = x_2 \quad \text{(Ex. 29)}$$

$$\dot{x}_2 = \ddot{x}_{lf} = -K_{cf}(1/M+1/m_f)x_{lf} - C_{cf}(1/M+1/m_f)\dot{x}_{lf} - K_{cr}/Mx_{lr} - C_{cr}/M\dot{x}_{lr} - (1/m_f)F_f = a_1 x_1 + a_2 x_2 + a_3 x_3 + a_4 x_4 + p_1 u_1 \quad \text{(Ex. 30)}$$

$$\dot{x}_3 = \dot{x}_{lr} = x_4 \quad \text{(Ex. 31)}$$

$$\dot{x}_4 = \ddot{x}_{lr} = -K_{cf}/Mx_{lf} - C_{cf}/M\dot{x}_{lf} - K_{cr}(1/M+1/m_r)x_{lr} - C_{cr}(1/M+1/m_r)\dot{x}_{lr} - (1/m_r)F_t = b_1 x_1 + b_2 x_2 + b_3 x_3 + b_4 x_4 + p_2 u_2 \quad \text{(Ex. 32)}$$

The above Expressions 28 to 32 are put together to obtain a state equation represented by the following Expression 33.

$$\begin{bmatrix} dx_1/dt \\ dx_2/dt \\ dx_3/dt \\ dx_4/dt \end{bmatrix} = \begin{bmatrix} 0 & 1 & 0 & 0 \\ a_1 & a_2 & a_3 & a_4 \\ 0 & 0 & 0 & 1 \\ b_1 & b_2 & b_3 & b_4 \end{bmatrix} \begin{bmatrix} x_1 \\ x_2 \\ x_3 \\ x_4 \end{bmatrix} + \begin{bmatrix} 0 & 0 \\ p_1 & 0 \\ 0 & 0 \\ 0 & p_2 \end{bmatrix} \begin{bmatrix} u_1 \\ u_2 \end{bmatrix} \quad \text{(Ex. 33)}$$

$$a_1 = -K_{cf}(1/M + 1/m_f) \quad b_1 = -K_{cf}/M \quad p_1 = -1/m_f$$
$$a_2 = -C_{cf}(1/M + 1/m_f) \quad b_2 = -C_{cf}/M \quad p_2 = -1/m_r$$
$$a_3 = -K_{cr}/M \quad b_3 = -K_{cr}(1/M + 1/m_r)$$
$$a_4 = -C_{cr}/M \quad b_4 = -C_{cr}(1/M + 1/m_r)$$

A relative displacement velocity y that is the first-order differential of the relative displacement $(x_{ltf} - x_{ltr})$ which is a difference between the amount of displacement $x_{ltf}$ of the front wheel shaft and the amount of displacement $x_{ltr}$ of the rear wheel shaft can be applied as the internal state quantity that expresses the longitudinal vibrations in the chassis vibration model. The relative displacement velocity y is expressed by the following Expression 34 based on the state equation of Expression 33.

$$y = dx_{ltf}/dt - dx_{ltr}/dt = \quad \text{(Ex. 34)}$$
$$(dx_l/dt - dx_{ltr}/dt) - (dx_l/dt - dx_{ltf}/dt) =$$

-continued $$dx_{lr}/dt - dx_{lf}/dt = x4 - x2 = \begin{bmatrix} 0 & -1 & 0 & 1 \end{bmatrix} \begin{bmatrix} x_1 \\ x_2 \\ x_3 \\ x_4 \end{bmatrix}$$

Figure 10:
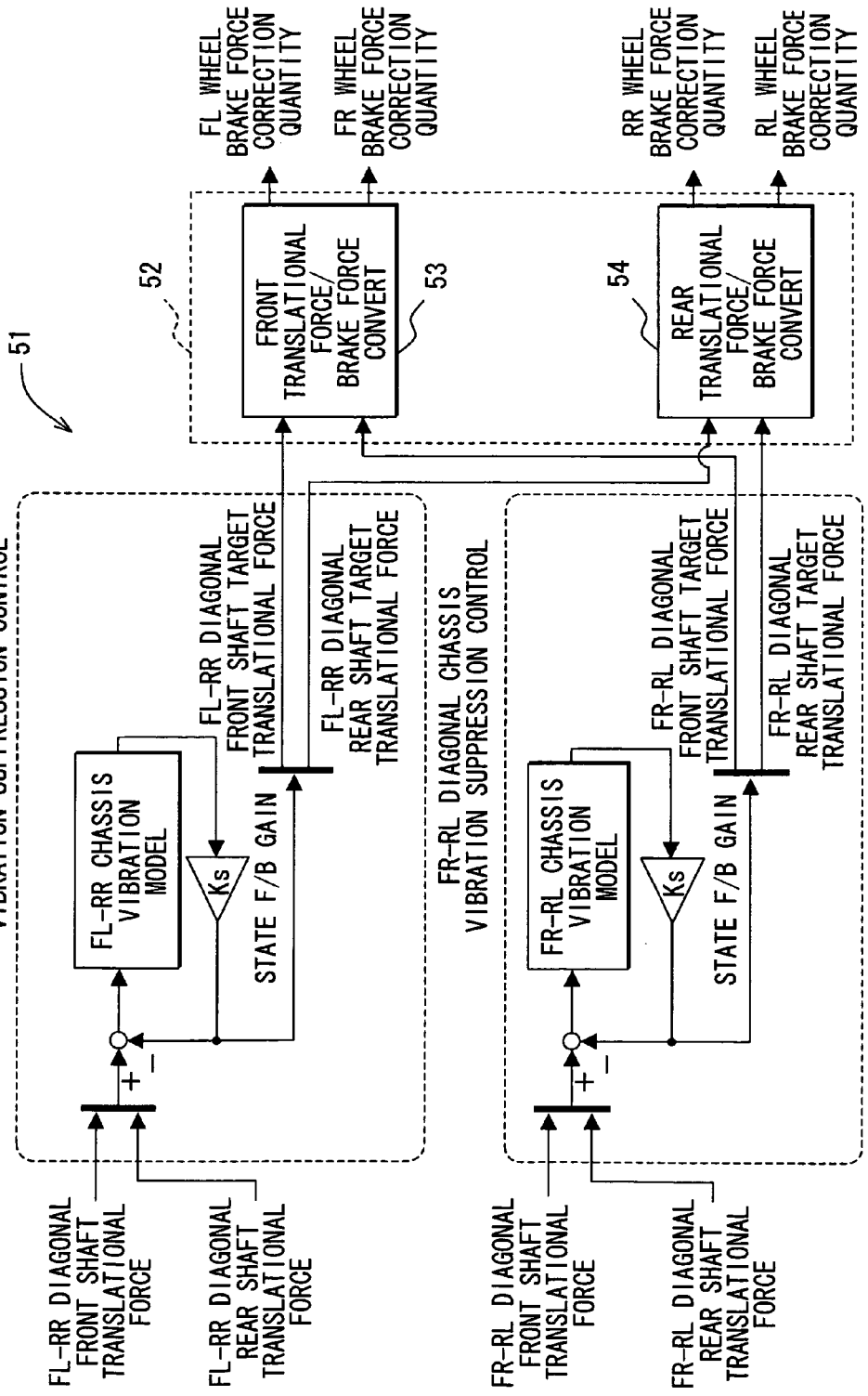
FIG. 10 is a block diagram showing a functional structure in a chassis longitudinal vibration estimate/control unit of a chassis control system in the embodiment.

The chassis longitudinal vibration estimate/control unit 51 in the chassis control system 50 of FIG. 3 is divided into one system made up of FL wheel to RR wheel diagonal elements and another system made up of FR wheel to RL wheel diagonal elements, as shown in FIG. 10. In the respective systems, the relative displacement velocity y that is calculated by the above Expression 34 is output to the controller as the internal state quantity. The controller multiplies the given state feedback gain Ks by the relative displacement velocity y to calculate the front wheel shaft target translational force and the rear wheel shaft target translational force for making the relative displacement velocity y rapidly approach zero in the respective systems. The relative displacement velocity y includes terms related to the relative displacement velocity $d_{xlf}/dt$ between the front wheel shaft and the chassis frame and the relative displacement velocity $d_{xlr}/dt$ between the rear wheel shaft and the chassis frame. For this reason, the front wheel shaft target translational force and the rear wheel shaft target translational force are calculated from the respective terms.

The front wheel shaft target translational force and the rear wheel shaft target translational force which are calculated with respect to the FL wheel to RR wheel diagonal element and the RF wheel to RL wheel diagonal element, respectively, are output to a front wheel shaft translational force and (/) braking force conversion unit 53 and a rear wheel shaft translational force and braking force conversion unit 54 in a chassis vibration correction braking force calculation unit 52.

The front wheel shaft translational force/braking force conversion unit 53 and the rear wheel shaft translational force/braking force conversion unit 54 convert the front wheel shaft target translational force and the rear wheel shaft target translational force, which are input thereto, respectively, into the braking force correction quantities of the respective wheels. In the conversion, the braking forces that enable the forces corresponding to the target translational forces that are input, respectively, to be exerted on the axles are calculated as the braking force correction quantities.

A correction braking force output unit 70 in FIG. 3 adds the braking force correction quantity that is output from the tire control system 40 and the braking force correction quantity that is output from the chassis control system 50 in each of the vehicle wheels to calculate one braking force correction quantity in each of the vehicle wheels.

The frequency band of the chassis vibrations and the frequency band of the tire vibrations are different from each other. Accordingly, in the correction braking force output unit 70, the braking force correction quantity from the tire control system 40 and the braking force correction quantity from the chassis control system 50 are also different in the frequency band from each other. For this reason, even if the respective braking force correction quantities are added, the respective correction components remain, thereby making it possible to suppress both of the chassis vibrations and the tire vibrations. As described above, as the respective braking force correction quantities, the common braking force correction quantity can be calculated with respect to the front right and left wheels and the rear right and left wheels.

Subsequently, the vehicle control system 60 in FIG. 3 will be described. As shown in FIG. 3, the vehicle control system 60 includes a vehicle body pitch vibration and (/) vertical vibration estimate/control unit 61 having a vehicle body vibration model. The vehicle body vibration model inputs the translational forces that are received from the front wheel shaft and the rear wheel shaft which are calculated in the chassis control system 50, and a drive torque reaction force that is applied directly to the vehicle body by the drive torque which is exerted on the rear wheel shaft which is the drive shaft to express the pitching vibrations and the vertical vibrations (bouncing vibrations) of the vehicle body. The vehicle body pitch vibration/vertical vibration estimate/control unit 61 calculates the drive torque correction quantity for suppressing the pitching vibrations and the vertical vibrations by the vehicle body vibration model. Further, the vehicle control system 60 includes a vehicle body rolling vibration and (/) engine rolling vibration estimate/control unit 62 having a vehicle body vibration model. The vehicle body vibration model inputs the road surface reaction force that is exerted on the front wheels in the lateral direction, and the drive torque reaction force to express the vehicle body rolling vibrations and the rolling vibrations of the engine. The vehicle body rolling vibration/engine rolling vibration estimate/control unit 62 calculates the drive torque correction quantity for suppressing the vehicle body rolling vibrations and the engine rolling vibrations by the vehicle body vibration model.

The engine is mounted on the chassis frame through an engine mount. The engine is heavy in the weight and greatly affects the rolling vibrations of the vehicle body, and therefore modeled as a part of the vehicle body.

Figure 11:
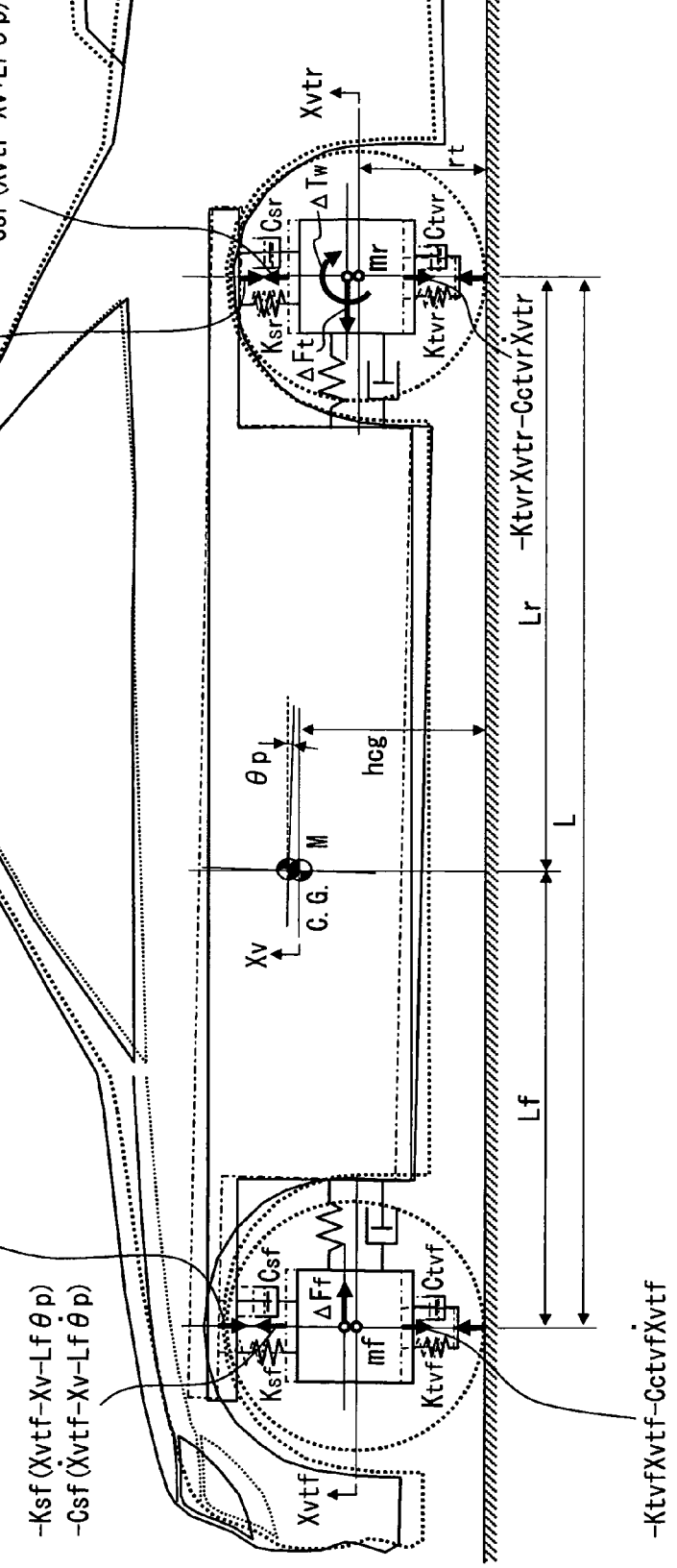
FIG. 11 is an explanatory diagram for explaining a vehicle body vibration model in the embodiment.

First, described is a specific motion equation related to the vehicle body vibration model which expresses the pitching vibrations and the vertical vibrations (bouncing vibrations) of the vehicle body with reference to FIG. 11. In constructing the vehicle body vibration model, the spring and damper elements in the vertical direction due to the front wheel side and rear wheel side suspensions and the spring and damper elements in the vertical direction due to the elasticity of the front and rear wheel tires are considered. The spring and damper elements in the vertical direction of the suspension includes not only the coil spring and damper unit, but also the rigidity in the vertical direction as a whole, including the flexible rigidity of the suspension arm and the rigidity of the diverse bushings.

The vehicle body vibration model formed to express the pitching vibrations and the bouncing vibrations is shown in FIG. 11. In this vehicle body vibration model, basic equations that are bases for calculating the motional equations for expressing the pitching vibrations and the bouncing vibrations are represented by Expression 35 to Expression 38. Expression 35 is an equation related to the vertical motion of the chassis frame, Expression 36 is an equation related to the vertical motion of the front wheel rotation center, Expression 37 is an equation related to the vertical motion of the rear wheel rotation center, and Expression 38 is an equation related to the pitching motion of the vehicle body.

$$M\ddot{x}_v = -K_f(x_v - x_{tf} + L_f\theta_p) - C_f(\dot{x}_v - \dot{x}_{tf} + L_f\dot{\theta}_p) - K_r(x_v - x_{tr} + L_r\theta_p) - C_r(\dot{x}_v - \dot{x}_{tr} + L_r\dot{\theta}_p) \quad \text{(Ex. 35)}$$

$$m_f\ddot{x}_{tf} = -K_f\{x_{tf} - (x_v + L_f\theta_p)\} - C_f\{\dot{x}_{tf} - (\dot{x}_v + L_f\dot{\theta}_p)\} - K_{tf}x_{tf} - C_{tf}\dot{x}_{tf} \quad \text{(Ex. 36)}$$

$$m_r\ddot{x}_{tr} = -K_r\{x_{tr} - (x_v + L_r\theta_p)\} - C_r\{\dot{x}_{tr} - (\dot{x}_v + L_r\dot{\theta}_p)\} - K_{tr}x_{tr} - C_{tr}\dot{x}_{tr} \quad \text{(Ex. 37)}$$

$$I_p\ddot{\theta}_p = -L_f\{K_f(x_v - x_{tf} + L_f\theta_p)\} + C_f\{\dot{x}_v - \dot{x}_{tf} + L_f\dot{\theta}_p\}\} + L_r\{K_r(x_v - x_{tr} - L_r\theta_p) + C_r\{\dot{x}_v - \dot{x}_{tr} - L_r\dot{\theta}_p\}\} - (h_{cg} - r_t)\Delta F_f + (h_{cg} - r_t)\Delta F_r + (\tfrac{1}{2})\Delta T_w \quad \text{(Ex. 38)}$$

In the above Expressions:

M is a mass of the sprung;

$x_v$ is the amount of displacement of the vehicle body in the vertical direction;

$K_f$ is a front wheel suspension spring rigidity;

$x_{tf}$ is the amount of displacement of the front wheel shaft in the vertical direction;

$L_f$ is a distance between the center of gravity of the vehicle and the front wheel shaft;

$\theta_p$ is a sprung pitch angle (pitch rotation center point=the center of gravity of the vehicle);

$C_f$ is a front wheel suspension damper attenuation coefficient;

$K_r$ is a rear wheel suspension spring rigidity;

$x_{tr}$ is the amount of displacement of the rear wheel shaft in the vertical direction;

$L_r$ is a distance between the center of gravity of the vehicle and the rear wheel shaft;

$C_r$ is a rear wheel suspension damper attenuation coefficient;

$m_f$ is a front wheel unsprung mass;

$K_{tf}$ is a spring rigidity of the front wheel tire in the vertical direction;

$C_{tf}$ is an attenuation coefficient of the front wheel tire in the vertical direction;

$m_r$ is a rear wheel unsprung mass;

$K_{tr}$ is a spring rigidity of the rear wheel tire in the vertical direction;

$C_{tr}$ is an attenuation coefficient of the rear wheel tire in the vertical direction;

$I_p$ is a sprung pitching inertia moment;

$h_{cg}$ is a height of the vehicle gravity center point (road surface base);

$r_t$ is a tire radius;

$F_f$ is a translational force exerted on the front wheel shaft defined by the internal state quantity of the tire vibration model;

$F_t$ is a translational force exerted on the rear wheel shaft defined by the internal state quantity of the tire vibration model; and $T_w$ is a drive torque that is exerted on the driving wheel shaft.

Similarly, in the vehicle body vibration model, the front and rear wheels in the diagonal direction (FR wheel and RL wheel and FL wheel and RR wheel) are combined together to add the drive torque correction quantities due to both of the diagonal elements. For this reason, all of the spring constant, the attenuation rate, and the mass in the respective equations are described as values per one wheel.

The above Expression 35 to Expression 38 can be modified into the following Expression 39 to Expression 42, respectively.

$$\ddot{x}_v = -(K_f + K_r)/M x_v - (C_f + C_r)/M \dot{x}_v + K_f/M x_{tf} + C_f/M \dot{x}_{tf} + K_r/M x_{tr} + C_r/M \dot{x}_{tr} - (K_f L_f - K_r L_r)/M \theta_p - (C_f L_f - C_r L_r)/M \dot{\theta}_p \quad \text{(Ex. 39)}$$

$$\ddot{x}_{tf} = K_f/m_f x_v + C_f/m_f \dot{x}_v - (K_f + K_{tf})/m_f x_{tf} - (C_f + C_{tf}) m_f \dot{x}_{tf} + K_f L_f/m_f \theta_p + C_f L_f/m_f \dot{\theta}_p \quad \text{(Ex. 40)}$$

$$\ddot{x}_{tr} = K_r/m_r x_v + C_r/m_r \dot{x}_v - (K_c + K_{tr})/m_r x_{tr} - (C_r + C_{tr}) m_r \dot{x}_{tr} + K_r L_r/m_r \theta_p - C_r L_r/m_r \dot{\theta}_p \quad \text{(Ex. 41)}$$

$$\ddot{\theta}_p = -(K_f L_f - K_r L_r)/I_p x_v - (C_f L_f - C_r L_r)/I_p \dot{x}_v + K_f L_f/I_p x_{tf} + C_f L_f/I_p \dot{x}_{tf} - K_r L_r/I_p x_{tr} - C_r L_r/I_p \dot{x}_{tr} - (K_f L_f^2 + K_r L_r^2) I_p \theta_p - (C_f L_f^2 + C_r L_r^2)/I_p \dot{\theta}_p - (h_{cg} - r_t)/I_p \Delta F_f + (h_{cg} - r_t)/I_p \Delta F_r + (\tfrac{1}{2} I_p)\Delta T_w \quad \text{(Ex. 42)}$$

The state variables $x_1$ to $x_8$, and $u_1$ to $u_3$ are defined by the following Expression 43.

$$x_1 = x_v, \ x_2 = \dot{x}_v, \ x_3 = x_{tf}, \ x_4 = \dot{x}_{tf}, \ x_5 = x_{tr}, \ x_6 = \dot{x}_{tr}, \ x_7 = \theta_p, \ x_8 = \dot{\theta}_p, \ u_1 = \Delta F_{bf}, \ u_2 = \Delta F_{br}, \ u_3 = \Delta T_w, \quad \text{(Ex. 43)}$$

Then, the respective first-order differentials of the state variables $x_1$ to $x_8$ can be expressed by Expressions 44 to 51.

$$\dot{x}_1 = \dot{x}_v = x_2 \quad \text{(Ex. 44)}$$

$$\begin{aligned}\dot{x}_2 = \ddot{x}_v &= -(K_f+K_r)/Mx_v - (C_f+C_r)/M\dot{x}_v + K_f/Mx_{tf} + C_f/M\dot{x}_{tf} \\&+ K_r/Mx_{tr} + C_r/M\dot{x}_{tr} - (K_fL_f-K_rL_r)/M\theta_p - (C_fL_f-C_rL_r)/M\dot{\theta}_p \\&= a_1x_1 + a_2x_2 + a_3x_3 + a_4x_4 + a_5x_5 + a_6x_6 + a_7x_7 + a_8x_8\end{aligned} \quad \text{(Ex. 45)}$$

$$\dot{x}_3 = \dot{x}_{tf} = x_4 \quad \text{(Ex. 46)}$$

$$\begin{aligned}\dot{x}_4 = \ddot{x}_{tf} &= K_f/m_f x_v + C_f/m_f \dot{x}_v - (K_f+K_{tf})/m_f x_{tf} - (C_f+C_{tf})/m_f \dot{x}_{tf} \\&+ K_fL_f/m_f \theta_p + C_fL_f/m_f \dot{\theta}_p = b_1x_1+b_2x_2+b_3x_3+b_4x_4+b_7x_7+b_8x_8\end{aligned} \quad \text{(Ex. 47)}$$

$$\dot{x}_5 = \dot{x}_{tr} = x_6 \quad \text{(Ex. 48)}$$

$$\begin{aligned}\dot{x}_6 = \ddot{x}_{tr} &= K_r/m_r x_v + C_r/m_r \dot{x}_v - (K_r+K_{tr})/m_r x_{tr} - (C_r+C_{tr})/m_r \dot{x}_{tr} \\&- K_rL_r/m_r \theta_p - C_rL_r/m_r \dot{\theta}_p = c_1x_1+c_2x_2+c_5x_5+c_6x_6+c_7x_7+c_8x_8\end{aligned} \quad \text{(Ex. 49)}$$

$$\dot{x}_7 = \dot{\theta}_p = x_8 \quad \text{(Ex. 50)}$$

$$\begin{aligned}\dot{x}_8 = \ddot{\theta}_p &= -(K_fL_f-K_rL_r)/I_p x_v - (C_fL_f-C_rL_r)/I_p \dot{x}_v + K_fL_f/I_p x_{tf} \\&+ C_fL_f/I_p \dot{x}_{tf} - K_rL_r/I_p x_{tr} - C_rL_r/I_p \dot{x}_{tr} - (K_fL_f^2+K_rL_r^2)/I_p \theta_p \\&- (C_fL_f^2+C_rL_r^2)/I_p \dot{\theta}_p - (h_{cg}-r_t)/I_p \Delta F_r + (h_{cg}-r_t)/I_p \Delta F_r + (1/2I_p)\Delta T_w\end{aligned} \quad \text{(Ex. 51)}$$

The above Expressions 44 to 51 are put together to obtain a state equation represented by the following Expression 52.

$$\begin{bmatrix} dx_1/dt \\ dx_2/dt \\ dx_3/dt \\ dx_4/dt \\ dx_5/dt \\ dx_6/dt \\ dx_7/dt \\ dx_8/dt \end{bmatrix} = \begin{bmatrix} 0 & 1 & 0 & 0 & 0 & 0 & 0 & 0 \\ a_1 & a_2 & a_3 & a_4 & a_5 & a_6 & a_7 & a_8 \\ 0 & 0 & 0 & 1 & 0 & 0 & 0 & 0 \\ b_1 & b_2 & b_3 & b_4 & 0 & 0 & b_7 & b_8 \\ 0 & 0 & 0 & 0 & 0 & 1 & 0 & 0 \\ c_1 & c_2 & 0 & 0 & c_5 & c_6 & c_7 & c_8 \\ 0 & 0 & 0 & 0 & 0 & 0 & 0 & 1 \\ d_1 & d_2 & d_3 & d_4 & d_5 & d_6 & d_7 & d_8 \end{bmatrix} \quad \text{(Ex. 52)}$$

$$\begin{bmatrix} x_1 \\ x_2 \\ x_3 \\ x_4 \\ x_5 \\ x_6 \\ x_7 \\ x_8 \end{bmatrix} + \begin{bmatrix} 0 & 0 & 0 \\ 0 & 0 & 0 \\ 0 & 0 & 0 \\ 0 & 0 & 0 \\ 0 & 0 & 0 \\ 0 & 0 & 0 \\ 0 & 0 & 0 \\ z_1 & z_2 & z_3 \end{bmatrix} \begin{bmatrix} u_1 \\ u_2 \\ u_3 \end{bmatrix}$$

$a_1 = -(K_f+K_r)/M$    $b_1 = K_f/m_f$    $c_1 = K_r/m_r$
$a_2 = -(C_f+C_r)/M$    $b_2 = C_f/m_f$    $c_2 = C_r/m_r$
$a_3 = K_f/M$    $b_3 = -(K_f+K_{tf})/m_f$    $c_5 = -(K_r+K_{tr})/m_r$
$a_4 = C_f/M$    $b_4 = -(C_f+C_{tf})/m_f$    $c_6 = -(C_r+C_{tr})/m_r$
$a_5 = K_r/M$    $b_7 = K_fL_f/m_f$    $c_7 = -K_rL_r/m_r$
$a_6 = C_r/M$    $b_8 = C_fL_f/m_f$    $c_8 = -C_rL_r/m_r$
$a_7 = -(K_fL_f - K_rL_r)/M$
$a_8 = -(C_fL_f - C_rL_r)/M$

-continued $d_1 = -(K_fL_f - K_rL_r)/I_p$    $z_1 = -(h_{cg}-r_t)/I_p$
$d_2 = -(C_fL_f - C_rL_r)/I_p$    $z_2 = (h_{cg}-r_t)/I_p$
$d_3 = K_fL_f/I_p$    $z_3 = 1/2I_p$
$d_4 = C_fL_f/I_p$
$d_5 = -K_rL_r/I_p$
$d_6 = -C_rL_r/I_p$
$d_7 = -(K_fL_f^2 + K_rL_r^2)/I_p$
$d_8 = -(C_fL_f^2 + C_rL_r^2)/I_p$ A sprung pitching velocity $y_1$ that is the first-order differential of the sprung pitch angle $\theta_p$ can be applied as the internal state quantity that expresses the pitching vibrations in the vehicle body vibration model. The sprung pitching velocity $y_1$ is expressed by the following Expression 53 based on the state equation of Expression 52.

$$y_1 = d\theta_p/dt = x_8 = [0\ 0\ 0\ 0\ 0\ 0\ 0\ 1]\begin{bmatrix} x_1 \\ x_2 \\ x_3 \\ x_4 \\ x_5 \\ x_6 \\ x_7 \\ x_8 \end{bmatrix} \quad \text{(Ex. 53)}$$

Also, a vehicle vertical velocity $y_2$ that is the first-order differential of the amount of displacement $x_v$ of the vehicle body in the vertical direction can be applied as the internal state quantity that expresses the vertical vibrations (bouncing vibrations) in the vehicle body vibration model. The displacement velocity $y_2$ is expressed by the following Expression 54 based on the state equation of Expression 52.

$$y_2 = dx_v/dt = x_2 = [0\ 1\ 0\ 0\ 0\ 0\ 0\ 0]\begin{bmatrix} x_1 \\ x_2 \\ x_3 \\ x_4 \\ x_5 \\ x_6 \\ x_7 \\ x_8 \end{bmatrix} \quad \text{(Ex. 54)}$$

Figure 12:
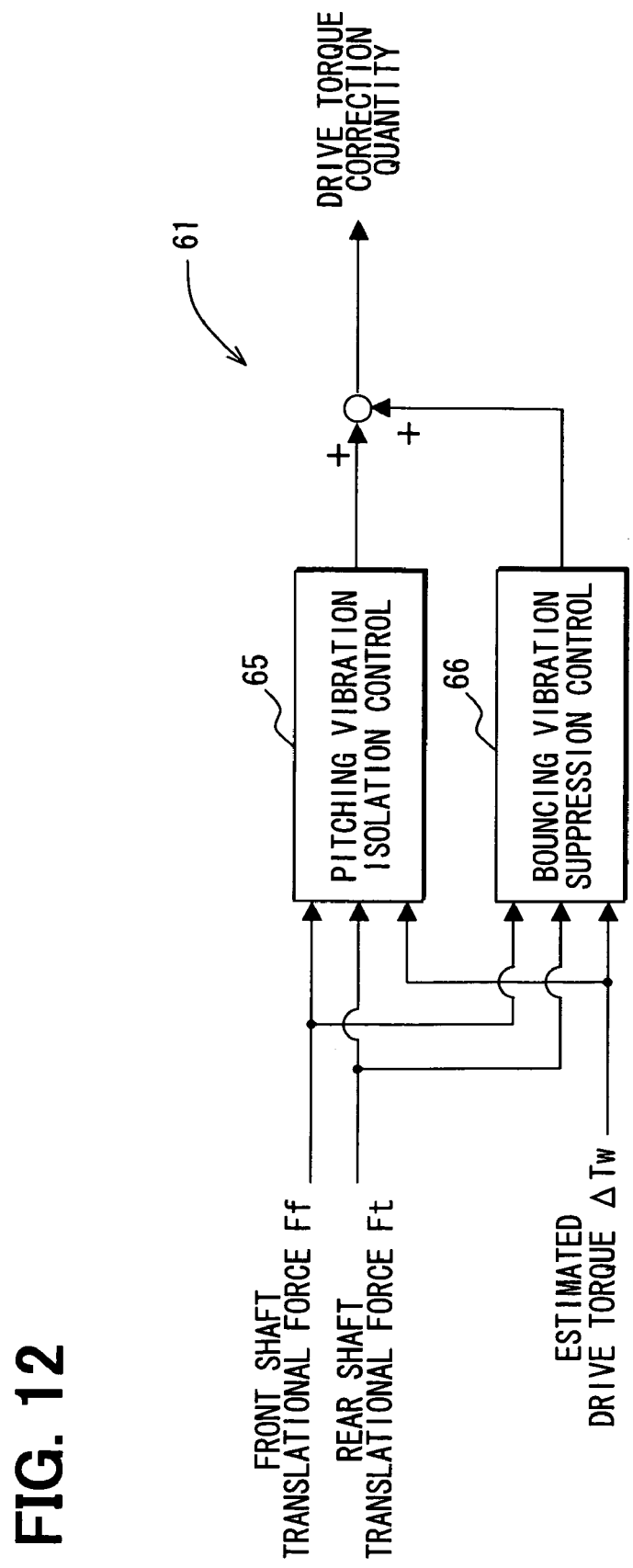
FIG. 12 is a block diagram showing a functional structure of a vehicle body pitch vibration and vertical vibration estimate/control unit of the vehicle body control system.

The vehicle body pitch vibration/vertical vibration estimate/control unit 61 in the vehicle body control system 60 of FIG. 3 includes a pitching vibration isolation control unit 65 and a bouncing vibration suppression control unit 66 as shown in FIG. 12. The pitching vibration isolation control unit 65 and the bouncing vibration suppression control unit 66 calculate the drive torque correction quantities for suppressing the pitching vibrations and the bouncing vibrations, respectively. The vehicle body pitch vibration/vertical vibration estimate/control unit 61 adds those drive torque correction quantities to put those quantities together, and outputs one drive torque correction quantity.

Figure 13:
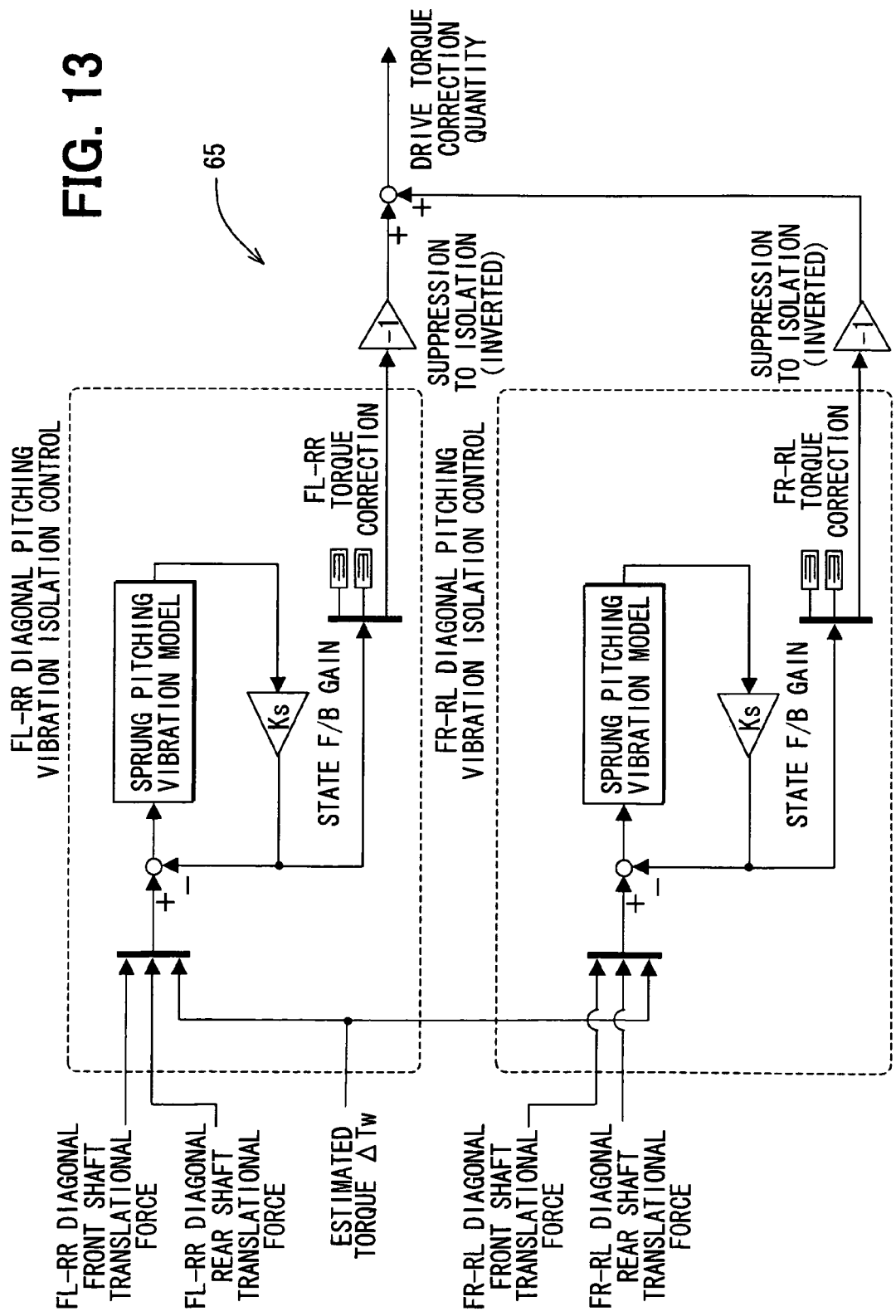
FIG. 13 is a block diagram showing a functional structure of a pitching vibration isolation control unit in the embodiment.

The detailed functional structure of the pitching vibration isolation control unit 65 is further shown in FIG. 13. The sprung pitching vibration model of the FL wheel to RR wheel diagonal element and the sprung pitching vibration model of the FR wheel to RL wheel diagonal element are formed in the FL wheel to RR wheel diagonal element control unit and the FR wheel to RL wheel diagonal element control unit. The respective sprung pitching vibration models output the sprung pitching velocity $y_1$ that is calculated according to the above Expression 53 as the internal state quantity indicative of the pitching vibrations. The controller multiplies the sprung pitching velocity $y_1$ by the given state feedback gain Ks to calculate the torque correction quantity.

When the drive torque correction quantities that are output by the FL wheel to RR wheel diagonal element control unit and the FR wheel to RL wheel diagonal element control unit, respectively, are put together, in order to conduct the vibration isolation, the drive torque correction quantity that is calculated by the FL wheel to RR wheel diagonal element control unit and the drive torque correction quantity that is calculated by the FR wheel to RL wheel diagonal element control unit are inverted in sign, and thereafter the respective drive torque correction quantities are added together to calculate the drive torque correction quantity for suppressing the pitching vibrations.

The detailed functional structure of the bouncing vibration isolation control unit 66 of FIG. 12 is shown in FIG. 14. As shown in FIG. 14, like the pitching vibration isolation control unit 65, the sprung bouncing vibration model of the FL wheel to RR wheel diagonal element and the sprung bouncing vibration model of the FR wheel to RL wheel diagonal element are formed in the FL wheel to RR wheel diagonal element control unit and the FR wheel to RL wheel diagonal element control unit. The respective sprung bouncing vibration models output the displacement velocity $y_2$ of the vehicle body in the vertical direction which is calculated according to the above Expression 54 as the internal state quantity indicative of the bouncing vibrations. The controller multiplies the displacement velocity $y_2$ of the vehicle body in the vertical direction by the given state feedback gain Ks to calculate the torque correction quantity.

The drive torque correction quantities that are output by the FL wheel to RR wheel diagonal element control unit and the FR wheel to RL wheel diagonal element control unit, respectively, are added together to obtain the drive torque correction quantity for suppressing the bouncing vibrations.

In the above example, the sprung pitching velocity $y_1$ is applied as the internal state quantity indicative of the pitching vibrations, and the displacement velocity $y_2$ of the vehicle body in the vertical direction is applied as the internal state quantity indicative of the bouncing vibrations. Alternatively, it is possible to suppress the pitching vibrations and the bouncing vibrations by other parameters.

For example, when the pitching vibrations occur, the front wheel ground load and the rear wheel ground load change in opposite phase. On the other hand, when the bouncing vibrations occur, the front wheel ground load and the rear wheel ground load change in the same phase. In this way, the front wheel ground load and the rear wheel ground load are parameters associated with the vibration state of the sprung (vehicle body). For this reason, the front wheel load variation velocity indicative of a change in the front wheel ground load and the rear wheel load variation velocity indicative of a change in the rear wheel ground load can be applied as the internal state quantities indicative of the pitching vibrations and the bouncing vibrations.

The front wheel load variation velocity is expressed by the following Expression 55, and the rear wheel load variation velocity is expressed by the following Expression 56. The front wheel load variation velocity and the rear wheel load variation velocity can be multiplied by the state feedback gain, respectively, thereby making it possible to calculate the drive torque correction quantity for suppressing the pitching vibrations and the bouncing vibrations.

$$y = C_{tf} dx_{tf}/dt = C_{tf} x_4 = [0\ 0\ 0\ C_{tf}\ 0\ 0\ 0\ 0] \begin{bmatrix} x_1 \\ x_2 \\ x_3 \\ x_4 \\ x_5 \\ x_6 \\ x_7 \\ x_8 \end{bmatrix} \quad \text{(Ex. 55)}$$

$$y = C_{tr} dx_{tr}/dt = C_{tr} x_6 = [0\ 0\ 0\ 0\ 0\ C_{tr}\ 0\ 0] \begin{bmatrix} x_1 \\ x_2 \\ x_3 \\ x_4 \\ x_5 \\ x_6 \\ x_7 \\ x_8 \end{bmatrix} \quad \text{(Ex. 56)}$$

Also, when the front wheel ground load and the rear wheel ground load change due to the pitching vibrations and the bouncing vibrations, because the cornering powers that are generated in the respective tires change, a stability factor that is used as an index indicative of the steering stability of the vehicle also changes. For this reason, the variation velocity of the stability factor can be applied as the internal state quantity indicative of the pitching vibrations and the bouncing vibrations.

The variation velocity of the stability factor is indicated by the following Expression 57. The variation velocity of the stability factor is multiplied by a state feedback gain that is set so that the variation velocity approaches zero, thereby making it possible to calculate the drive torque correction quantity.

$$y = d(S.F.)/dt = -C_w L_f C_{tf} x_4 + C_w L_r C_{tr} x_6 \quad \text{(Ex. 57)}$$

$$= [0\ 0\ 0\ p_1\ 0\ p_2\ 0\ 0] \begin{bmatrix} x_1 \\ x_2 \\ x_3 \\ x_4 \\ x_5 \\ x_6 \\ x_7 \\ x_8 \end{bmatrix}$$

$$(p_1 = -C_w L_f C_{tf},\ p_2 = C_w L_r C_{tr})$$

Subsequently, a specific motion equation related to a vehicle body vibration model that expresses the rolling vibrations of the vehicle body and the rolling vibrations of the engine is described with reference to FIGS. 15A and 15B. The vehicle body vibration model inputs the lateral reaction force that is exerted on the front wheel shaft which is calculated by the front-wheel lateral road surface reaction force estimate unit 32 and a reaction force from the engine (and the transmission) which are mounted on the chassis frame through the engine mount to simulate the rolling vibrations about the vehicle body rolling center and the rolling vibrations about the engine rolling center.

In forming the vehicle body vibration model, the spring and damper elements in the vertical direction due to the front wheel side suspension and the rear wheel side suspension and the spring and damper elements of the engine mount are considered.

FIGS. 15A and 15B show a vehicle body vibration model formed for expressing the rolling vibration of the vehicle body and the rolling vibration of the engine. In the vehicle body vibration model, basic equations that are bases for calculating the motional equations that express the rolling vibration of the vehicle body and the rolling vibration of the engine are represented by Expression 58 to Expression 59. Expression 58 is an equation related to the motion of the engine (and the transmission) in the rolling direction, and Expression 59 is an equation related to the motion of the vehicle body in the rolling direction.

$$I_e \ddot{\theta}_e = -(w_e/2)K_e[(w_e/2)\theta_e - \{(w_e/2)\theta_r + x_v\}] - \\ (w_e/2)C_e[(w_e/2)\dot{\theta}_e - \{(w_e/2)\dot{\theta}_r + \dot{x}_v\}] - \\ (w_e/2)K_e[(w_e/2)\theta_e - \{(w_e/2)\theta_r - x_v\}] - \\ (w_e/2)C_e[(w_e/2)\dot{\theta}_e - \{(w_e/2)\dot{\theta}_r - \dot{x}_v\}] + \Delta T_o \quad \text{(Ex. 58)}$$

$$I_r \ddot{\theta}_r = -(w_f/2)\big[K_{sf}\{x_v + L_f\theta_p + (w_f/2)\theta_r - x_{vtf}\} + \\ C_{sf}\{\dot{x}_v + L_f\dot{\theta}_p + (w_f/2)\dot{\theta}_r - \dot{x}_{vtf}\}\big] + \\ (w_f/2)\big[K_{sf}\{x_v + L_f\theta_p - (w_f/2)\theta_r - x_{vtf}\} + \\ C_{sf}\{\dot{x}_v + L_f\dot{\theta}_p - (w_f/2)\dot{\theta}_r - \dot{x}_{vtf}\}\big] - \\ (w_r/2)\big[K_{sr}\{x_v - L_r\theta_p + (w_r/2)\theta_r - x_{vtr}\} + \\ C_{sr}\{\dot{x}_v - L_r\dot{\theta}_p + (w_r/2)\dot{\theta}_r - \dot{x}_{vtr}\}\big] + \\ (w_r/2)\big[K_{sr}\{x_v - L_r\theta_p - (w_r/2)\theta_r - x_{vtr}\} + \\ C_{sr}\{\dot{x}_v - L_r\dot{\theta}_p - (w_r/2)\dot{\theta}_r - \dot{x}_{vtr}\}\big] - \\ (w_e/2)\big[K_e\{(w_e/2)\theta_r + x_v - (w_e/2)\theta_e\} + \\ C_e\{(w_e/2)\dot{\theta}_r + \dot{x}_v - (w_e/2)\dot{\theta}_e\}\big] - \\ (w_e/2)\big[K_e\{(w_e/2)\theta_r - x_v - (w_e/2)\theta_e\} + \\ C_e\{(w_e/2)\dot{\theta}_r - \dot{x}_v - (w_e/2)\dot{\theta}_e\}\big] - \\ Mg(h_{cg} - h_r)\theta_r + (h_{cg} - r_t)\Delta F_{y\_L} + (h_{cg} - r_t)\Delta F_{y\_R} \quad \text{(Ex. 59)}$$

In the above Expressions:

$I_e$ is an inertia moment of the engine (and the transmission) in the rolling direction;
$\theta_e$ is a rolling angle (rolling rotation center=crank shaft rotation center) of the engine (and the transmission);
$w_e$ is a distance between right and left engine mounts;
$K_e$ is a spring rigidity for one engine mount;
$\theta_r$ is a rolling angle of the vehicle body;
$x_v$ is the amount of displacement of the vehicle body in the vertical direction;
$C_e$ is an attenuation coefficient for one engine mount;
$T_o$ is an output shaft torque of a transmission outlet;
$I_r$ is a sprung rolling inertia moment;
$w_f$ is a front wheel tread;
$K_{sf}$ is a front wheel suspension spring rigidity;
$L_f$ is a distance between the center of gravity of the vehicle and the front wheel shaft;
$\theta_p$ is a sprung pitch angle;
$x_{vtf}$ is the amount of displacement of the front wheel shaft in the vertical direction;
$C_{sf}$ is a front wheel suspension damper attenuation coefficient;
$w_r$ is a rear wheel tread;
$K_{sr}$ is a rear wheel suspension spring rigidity;
$L_r$ is a distance between the center of gravity of the vehicle and the rear wheel shaft;
$x_{vtr}$ is the amount of displacement of the rear wheel shaft in the vertical direction;
$C_{sr}$ is a rear wheel suspension damper attenuation coefficient;
g is a gravity acceleration;
$h_{cg}$ is a height of the center of gravity of the vehicle (road surface base);
$h_r$ is a height of the vehicle body rolling center (rolling shaft is in parallel with the longitudinal direction);
$r_t$ is a tire radius;
$F_{y\_L}$ is a lateral translational force exerted on the front wheel shaft; and
$F_{y\_R}$ is a lateral translational force exerted on the rear wheel shaft.

The above Expression 58 and Expression 59 can be modified into the following Expression 60 and Expression 61, respectively.

$$\ddot{\theta}_e = -(w_e^2/2)K_e/I_e\theta_e - (w_e^2/2)C_e/I_e\dot{\theta}_e + (w_e^2/2)K_e/I_e\theta_r + \\ (w_e^2/2)C_e/I_e\dot{\theta}_r + (1/R_dI_e)\Delta T_w \quad \text{(Ex. 60)}$$

$$\ddot{\theta}_r = (w_e^2/2)K_e/I_r\theta_e + (w_e^2/2)C_e/I_r\dot{\theta}_e - \{(w_e^2/2)K_e + (w_f^2/2) \\ K_{sf} + (w_r^2/2)K_{sr} - Mg(h_{cg} - h_r)\}/I_r\theta_r - \{(w_e^2/2)C_e + \\ (w_f^2/2)C_{sf} + (w_r^2/2)C_{sr}/I_r\dot{\theta}_r + (h_{cg} - r_t)/I_r\Delta F_{y\_L} + \\ (h_{cg} - r_t)/I_r\Delta F_{y\_R} \quad \text{(Ex. 61)}$$

where the state variables $x_1$ to $x_4$ are defined by the following Expression 62.

$$x_1\theta_e, x_2 = \dot{\theta}_e, x_3 = \theta_r, x_4 = \dot{\theta}_r, u = \Delta T_w \quad \text{(Ex. 62)}$$

Then, the respective first-order differentials of the state variables $x_1$ to $x_4$ and u can be expressed by Expressions 63 to 66.

$$\dot{x}_1 = x_2 \quad \text{(Ex. 63)}$$

$$\dot{x}_2 = \ddot{\theta}_e = -(w_e^2/2)K_e/I_e\theta_e - (w_e^2/2)C_e/I_e\dot{\theta}_e + \quad \text{(Ex. 64)}\\
(w_e^2/2)K_e/I_e\theta_r + (w_e^2/2)C_e/I_e\dot{\theta}_r + 1/(R_dI_e)\Delta T_w \\
= e_1x_1 + e_2x_2 + e_3x_3 + e_4x_4 + z_1u_1$$

$$\dot{x}_3 = x_4 \quad \text{(Ex. 65)}$$

$$\dot{x}_4 = \ddot{\theta}_r = (w_e^2/2)K_e/I_r\theta_e + (w_e^2/2)C_e/I_r\dot{\theta}_e - \{(w_e^2/2)K_e + \quad \text{(Ex. 66)}\\
(w_f^2/2)K_{sf} + (w_r^2/2)K_{sr} - Mg(h_{cg} - h_r)\}/I_r\theta_r - \\
\{(w_e^2/2)C_e + (w_f^2/2)C_{sf} + (w_r^2/2)C_{sr}/I_r\dot{\theta}_r - \\
(h_{cg} - r_t)/I_r\Delta F_{y\_L} + (h_{cg} - r_t)/I_r\Delta F_{y\_R} \\
= f_1x_1 + f_2x_2 + f_3x_3 + f_4x_4 + z_2u_2 + z_3u_3$$

The above Expressions 63 to 66 are put together to obtain a state equation represented by the following Expression 67.

$$\begin{bmatrix} dx_1/dt \\ dx_2/dt \\ dx_3/dt \\ dx_4/dt \end{bmatrix} = \begin{bmatrix} 0 & 1 & 0 & 0 \\ e_1 & e_2 & e_3 & e_4 \\ 0 & 0 & 0 & 1 \\ f_1 & f_2 & f_3 & f_4 \end{bmatrix} \begin{bmatrix} x_1 \\ x_2 \\ x_3 \\ x_4 \end{bmatrix} + \begin{bmatrix} 0 & 0 & 0 \\ z_1 & 0 & 0 \\ 0 & 0 & 0 \\ 0 & z_2 & z_3 \end{bmatrix} \begin{bmatrix} u_1 \\ u_2 \\ u_3 \end{bmatrix} \quad \text{(Ex. 67)}$$

-continued $$e_1 = -(w_e^2/2)K_e/I_e \quad z_1 = 1/(R_d I_e)$$
$$e_2 = -(w_e^2/2)C_e/I_e \quad z_2 = (h_{cg} - r_t)/I_r$$
$$e_3 = (w_e^2/2)K_e/I_e \quad z_3 = (h_{cg} - r_t)/I_r$$
$$f_1 = (w_e^2/2)K_e/I_r$$
$$f_2 = (w_e^2/2)C_e/I_r$$
$$f_3 = -\{(w_e^2/2)K_e + (w_f^2/2)K_{sf} + (w_r^2/2)K_{sr} - Mg(h_{cg} - h_r)\}/I_r$$
$$f_4 = -\{(w_e^2/2)C_e + (w_f^2/2)C_{sf} + (w_r^2/2)C_{sr}\}/I_r$$

A vehicle rolling velocity $y_1$ that is the first-order differential of the rolling angle $\theta_r$ of the vehicle body can be applied as the internal state quantity that expresses the rolling vibrations of the vehicle body in the vehicle body vibration model. The vehicle body rolling velocity $y_1$ is expressed by the following Expression 68 based on the state equation of Expression 67.

$$y_1 = d\theta_r/dt = x_4 = [0\ 0\ 0\ 1]\begin{bmatrix}x_1\\x_2\\x_3\\x_4\end{bmatrix} \quad \text{(Ex. 68)}$$

Also, an engine rolling velocity $y_2$ that is the first-order differential of the engine rolling angle $\theta_e$ can be applied as the internal state quantity that expresses the engine rolling vibrations in the vehicle body vibration model. The engine rolling velocity $y_2$ is expressed by the following Expression 69 based on the state equation of Expression 67.

$$y_2 = d\theta_e/dt = x_2 = [0\ 1\ 0\ 0]\begin{bmatrix}x_1\\x_2\\x_3\\x_4\end{bmatrix} \quad \text{(Ex. 69)}$$

The vehicle body rolling vibration/engine rolling vibration estimate/control unit 62 in the vehicle body control system 60 of FIG. 3 includes a vehicle body rolling vibration control unit 62a for suppressing the rolling vibrations of the vehicle body, and an engine rolling vibration control unit 62b for suppressing the rolling vibrations of the engine.

Figure 16:
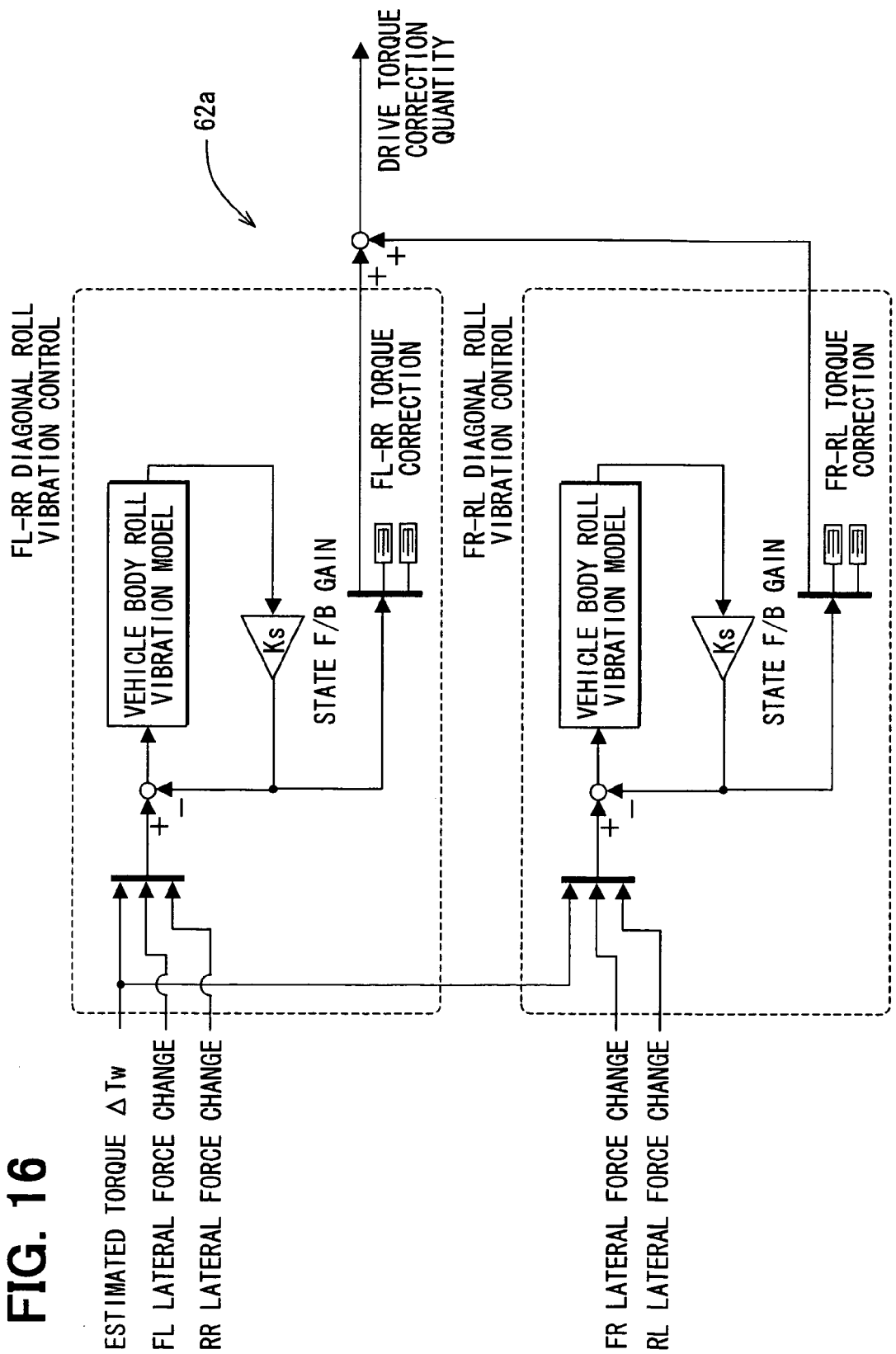
FIG. 16 is a block diagram showing a functional structure of a vehicle body roll vibration control unit in the embodiment.

The detailed functional structure of a vehicle body roll vibration control unit 62a is shown in FIG. 16. The vehicle body roll vibration control unit is made up of the FL wheel to RR wheel diagonal element control unit and the FR wheel to RL wheel diagonal element control unit. Then, the vehicle body rolling vibration model of the FL wheel to RR wheel diagonal element and the vehicle body rolling vibration model of the FR wheel to RL wheel diagonal element are formed in the FL wheel to RR wheel diagonal element control unit and the FR wheel to RL wheel diagonal element control unit. The respective vehicle body rolling vibration models output the vehicle body rolling angular velocity $y_1$ that is calculated according to the above Expression 68 as the internal state quantity indicative of the vehicle body rolling vibrations. The respective controllers multiply the vehicle body rolling angular velocity $y_1$ by the given state feedback gain Ks to calculate the torque correction quantity.

The drive torque correction quantities that are output by the FL wheel to RR wheel diagonal element control unit and the FR wheel to RL wheel diagonal element control unit, respectively, are added together to obtain the drive torque correction quantity for suppressing the vehicle body rolling vibrations.

Figure 17:
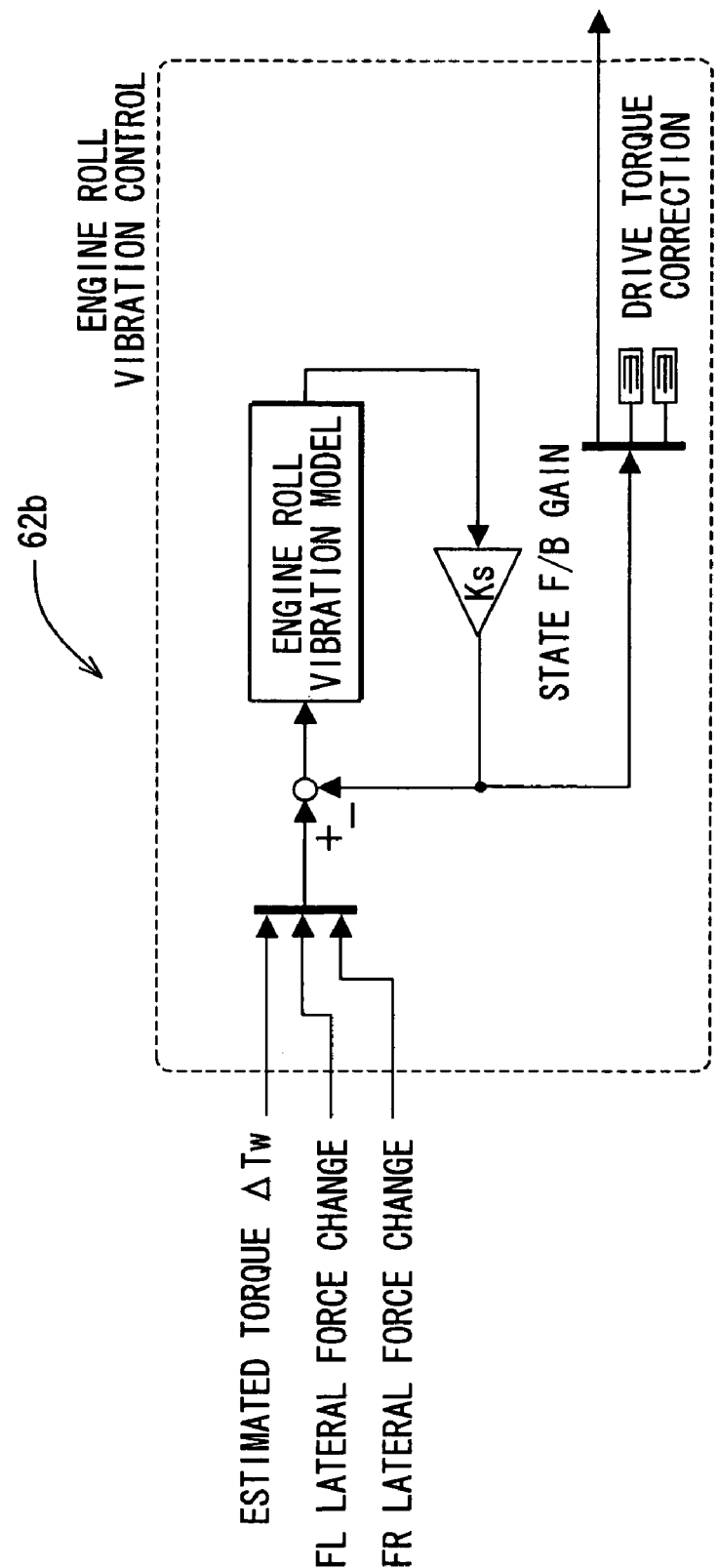
FIG. 17 is a block diagram showing a functional structure of an engine roll vibration control unit in the embodiment.

The detailed functional structure of an engine roll vibration control unit 62b is shown in FIG. 17. The engine roll vibration control unit 62b has an engine rolling vibration model and the engine rolling vibration model outputs the engine rolling angular velocity $y_2$ that is calculated according to the above Expression 69 as the internal state quantity indicative of the engine rolling vibrations. The controller multiplies the given state feedback gain Ks by the engine rolling angular velocity $y_2$ to calculate the torque correction quantity.

In this embodiment, the vehicle vibration model that is separated and hierarchized into the tire vibration model, the chassis vibration model and the vehicle body vibration model is formed in the manner described above. For this reason, it is possible to express the respective models as the reduced-order linear models, and the capacity for storing the vehicle vibration model can be reduced, and the calculation load based on the vehicle vibration model can be reduced in the engine/drive system ECU 10 and the brake system ECU 20.

The present invention is not limited to the above embodiment, but various changes may be made without departing from the scope of the invention.

For example, in the above embodiment, the engine/drive system ECU 10 corrects the drive torque that is given to the driving wheels of the vehicle to suppress the vibrations (pitch, bounce, and roll) which are generated in the body of the vehicle, and the brake system ECU 20 corrects the braking forces of the respective wheels of the vehicle to suppress the vibrations which are generated in the chassis or the tires of the vehicle. However, when the motion state of the vehicle can be changed, and the operation state can be controlled, the vibration suppression control of any one of the vehicle body, the chassis, and the tires can be conducted by an ECU that controls another device to be controlled.

For example, there is a vehicle having an electric motor in addition to an internal combustion engine as the drive source of the vehicle as in a hybrid vehicle that drives the common driving wheels by the internal combustion engine and the electric motor, and an electric type four wheel drive vehicle that drives one of front wheels and rear wheels by the internal combustion engine, and drives the other wheels by an electric motor as the occasion demands. In the above vehicles, the electric motor can suppress the vibrations of the chassis and the tires under the control. Because the electric motor is very high in the response of the output change to a control instruction, the electric motor can appropriately control the vibration suppression of the chassis or the tires which are high in the vibration frequency.

Even in the case of controlling the suppression of the vibrations of the chassis and the tires by the electric motor, the same chassis vibration model and tire vibration model as those described in the above embodiment can be used. Then, the drive torque (correction quantity) for reducing the vibrations can be calculated based on the internal state quantities indicative of the respective vibration states, which are output from the chassis vibration model and the tire vibration model.

Also, in the above embodiment, the brake system ECU 20 corrects the braking forces of the respective wheels of the vehicle to suppress the vibrations which are generated in the chassis or the tires of the vehicle. Alternatively, it is possible that the engine/drive system ECU 10 implements the suppression control of the vehicle body vibrations and the chassis vibrations, and the brake system ECU 20 implements the suppression control of the tire vibrations. Further, the vehicle vibrations, the chassis vibrations, and the tire vibrations can be suppressed by respective different devices to be controlled.

As an example, the different devices to be controlled include plural operation members that operate the operating state of the internal combustion engine. That is, for example, it is possible that the same vehicle vibration model is stored in an ECU that controls a motor that adjusts the opening degree of a throttle valve, a fuel injection device or an ignition device as different devices to be controlled, to share the suppression controls of the vehicle body vibrations, the chassis vibrations, and the tire vibrations.

Also, in the above embodiments, the vehicle control system is applied to the FR vehicle that steers the front wheels and drives the rear wheels. However, the vehicle to be applied can be an FF vehicle or a four WD vehicle.

What is claimed is:

1. A vehicle control system disposed within a vehicle, the vehicle control system comprising:
a first control unit and a second control unit that respectively store the same vehicle vibration model on a computer readable medium that is separated into a vehicle body vibration model, a chassis vibration model and a tire vibration model to estimate vibration states of various portions of a vehicle; and
a first operation device and a second operation device, which are controllable by the first control unit and the second control unit, respectively, to change motion states of the vehicle,
wherein the first control unit and the second control unit receive the same input parameters to be input to the vehicle vibration model and calculate estimated vibration states of the various portions of the vehicle, respectively,
wherein the first control unit and the second control unit share subject models to be controlled in vibration suppression among the vehicle body vibration model, the chassis vibration model and the tire vibration model,
wherein the first control unit and the second control unit calculate control quantities according to the vibration states in the subject models to control the first operation device and the second operation device, respectively, and
wherein the first control unit calculates estimated vibration states at a first frequency and the second control unit calculates estimated vibration states at a second frequency, the second frequency being different than the first frequency.

2. The vehicle control system according to claim 1, wherein:
the first operation device and the second operation device are different in a dynamic response until the motion state of the vehicle changes when the first operation device and the second operation device are controlled by the first control unit and the second control unit, respectively, and the first operation device is higher in the dynamic response than the second operation device;
the first control unit calculates the control quantity for suppressing vibrations that are generated in the vehicle body vibration model and the tire vibration model with the vehicle body vibration model and the tire vibration model as the subject model in the vibration suppression to control the first operation device; and
the second control unit calculates the control quantity for suppressing vibrations that are generated in the chassis vibration model with the chassis vibration model as the subject model to be controlled in the vibration suppression to control the second operation device.

3. The vehicle control system according to claim 2, wherein:
the first control unit calculates the control quantity for suppressing the vibrations that are generated in the chassis vibration model and the control quantity for suppressing the vibrations that are generated in the tire vibration model, respectively, and controls the first operation device based on a sum of the control quantities calculated by the first control unit.

4. The vehicle control system according to claim 1, wherein:
the first operation device is a braking force generating device that generates braking forces in respective wheels; and
the second operation device is an adjusting device that adjusts an operating state of an internal combustion engine of the vehicle.

5. The vehicle control system according to claim 4, wherein:
the first control unit calculates travel resistances that affect respective wheels of the vehicle based on wheel velocities of respective wheels and supplies calculated travel resistances to the second control unit;
the second control unit calculates drive torques that are transmitted to the driving wheels from the internal combustion engine and supplies calculated drive torques to the first control unit; and
the first control unit and the second control unit input at least the travel resistances of the respective wheels and the drive torques transmitted to the driving wheels to the vehicle vibration model as input parameters.

6. The vehicle control system according to claim 4, wherein:
the second control unit calculates a basic control quantity based on accelerator pedal operation by a driver, calculates the control quantity for suppressing the vibrations that are generated in the vehicle body vibration model as a correction control quantity, and controls the adjusting device that adjusts the operating state of the internal combustion engine based on the basic control quantity and the correction control quantity.

7. The vehicle control system according to claim 4, wherein:
the first control unit calculates a basic control quantity based on brake pedal operation by a driver, calculates the control quantity for suppressing the vibrations that are generated in the chassis vibration model and the tire vibration model as a correction control quantity, and controls the braking force generating device based on the basic control quantity and the correction control quantity.

8. The vehicle control system according to claim 1, wherein:
the vehicle includes an internal combustion engine and an electric motor as a drive source for rotationally driving wheels;
the first operation device is the electric motor; and
the second operation device is an adjusting device that adjusts the operating state of the internal combustion engine.

9. The vehicle control system according to claim 8, wherein:
the internal combustion engine and the electric motor are mounted on the vehicle so as to rotationally drive different wheels, respectively.

10. The vehicle control system according to claim 1, wherein the first operation device and the second operation device directly control components of the vehicle to change the motion states of the vehicle.

11. The vehicle control system according to claim 1, wherein the control quantities calculated by the first control unit are different than the control quantities calculated by the second control unit.

12. The vehicle control system according to claim 1, wherein the vibration states in one of the subject models used by the first control unit is different than one of the subject models used by the second control unit.

13. The vehicle control system according to claim 1, wherein:
the first operation device and the second operation device are different in a dynamic response until the motion state of the vehicle changes when the first operation device and the second operation device are controlled by the first control unit and the second control unit, respectively, and the first operation device is higher in the dynamic response than the second operation device; and
the second control unit obtains influences of control quantities by the first control unit from the vehicle vibration model, and calculates control quantities to the vibration state in the subject models to control the second operation device based on the obtained influences.

14. The vehicle control system according to claim 1, wherein the first operation device is different than the second operation device.

* * * * *